US012044465B2

United States Patent
Lee et al.

(10) Patent No.: US 12,044,465 B2
(45) Date of Patent: Jul. 23, 2024

(54) METHOD FOR CONTROLLING AND MANAGING FRONT DOOR REFRIGERATOR USING APPLICATION INSTALLED IN RECORDING MEDIUM

(71) Applicant: LG ELECTRONICS INC., Seoul (KR)

(72) Inventors: Seojin Lee, Seoul (KR); Wonjin Lee, Seoul (KR); Insun Yeo, Seoul (KR); Eugene Myung, Seoul (KR); Miyoung Seo, Seoul (KR); Kyukwan Choi, Seoul (KR); Minkyu Oh, Seoul (KR); Yezo Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 17/433,329

(22) PCT Filed: Feb. 13, 2020

(86) PCT No.: PCT/KR2020/002083
§ 371 (c)(1),
(2) Date: Aug. 24, 2021

(87) PCT Pub. No.: WO2020/175837
PCT Pub. Date: Sep. 3, 2020

(65) Prior Publication Data
US 2022/0155005 A1    May 19, 2022

(30) Foreign Application Priority Data

Feb. 25, 2019  (KR) ........................ 10-2019-0021867
Jun. 12, 2019  (KR) ........................ 10-2019-0069452

(51) Int. Cl.
*A47G 29/14*    (2006.01)
*F25D 29/00*    (2006.01)
(Continued)

(52) U.S. Cl.
CPC ........... *F25D 29/00* (2013.01); *A47G 29/141* (2013.01); *G05B 19/042* (2013.01);
(Continued)

(58) Field of Classification Search
CPC .............. F25D 29/00; F25D 2400/361; F25D 2500/06; A47G 29/141; H04L 9/3228; H04M 1/72409; H04M 1/72469
See application file for complete search history.

(56) References Cited

U.S. PATENT DOCUMENTS

2015/0373401 A1* 12/2015 Kwon ................ H04N 21/4227
                                                              725/80
2016/0058181 A1*  3/2016 Han ...................... A47B 81/00
                                                              312/236
2017/0213187 A1    7/2017 Choi et al.

FOREIGN PATENT DOCUMENTS

CN        1474144 A     2/2004
CN      108471893 A     8/2018
(Continued)

*Primary Examiner* — Michael W Choi
(74) *Attorney, Agent, or Firm* — Bryan Cave Leighton Paisner LLP

(57) ABSTRACT

A method for controlling and managing a front door refrigerator using an application installed in a recording medium, according to an embodiment of the present invention, comprises: a step in which a user logs into a front door refrigerator control application installed in a recording medium including a mobile device, thereby allowing a main screen including menu display regions to be displayed on a display unit of the mobile device; and a step in which a storage information confirmation menu is selected from among a plurality of execution menus displayed in the menu display regions, wherein, when the storage information confirmation menu is selected, storage information of a product stored in the front door refrigerator is output to the display unit of the mobile device.

13 Claims, 27 Drawing Sheets

(51) Int. Cl.
  *G05B 19/042*   (2006.01)
  *G07C 9/00*   (2020.01)
  *H04L 9/32*   (2006.01)
  *H04M 1/72409*   (2021.01)
  *H04M 1/72469*   (2021.01)

(52) U.S. Cl.
  CPC ........ *G07C 9/00817* (2013.01); *H04L 9/3228* (2013.01); *A47G 2029/145* (2013.01); *A47G 2029/147* (2013.01); *A47G 2029/149* (2013.01); *F25D 2400/361* (2013.01); *F25D 2500/06* (2013.01); *G05B 2219/2654* (2013.01); *H04M 1/72409* (2021.01); *H04M 1/72469* (2021.01)

(56) References Cited

FOREIGN PATENT DOCUMENTS

| | | | | |
|---|---|---|---|---|
| CN | 108685454 | A | 10/2018 | |
| EP | 1211971 | A1 * | 6/2002 | ......... A47G 29/1201 |
| JP | 2006130609 | A | 5/2006 | |
| KR | 20110033394 | A | 3/2011 | |
| KR | 20130005828 | A | 1/2013 | |
| KR | 20140100738 | A | 8/2014 | |
| KR | 1020170087705 | A | 7/2017 | |
| KR | 20180029617 | A | 3/2018 | |
| KR | 101875282 | B1 | 7/2018 | |

\* cited by examiner

FIG. 16

| < | Arrived parcel information |
|---|---|
| 12/10 15:30 A mart | |
| 12/08 07:30 A mart | |
| 12/07 15:30 B mart | |
| 12/05 11:00 C mart | |
| 12/03 10:30 A mart | |
| 12/02 16:45 D mart | |
| 11/27 13:00 E mart | |
| 11/20 14:30 F mart | |

FIG. 17

| Cancel | Parcel information input | Storage |

Date 11  10

December 11, 2019

1  12

Company name

B mart

Courier contact information 010-0000-0000

( Authentication code generation )   ( Storage )

FIG. 30

| Cancel | Refrigerating reservation | Storage |

Date 11　10

December 11, 2019

1　12

Time 11　44

AM　12　45

PM　1　46

Refrigerating　[ ON ]　[ OFF ]
　　　　　　　　　204　　205

METHOD FOR CONTROLLING AND MANAGING FRONT DOOR REFRIGERATOR USING APPLICATION INSTALLED IN RECORDING MEDIUM

This application is a National Stage Application of International Application No. PCT/KR2020/002083, filed Feb. 13, 2020, which claims the benefit of Korean Patent Application No. 10-2019-0021867, filed Feb. 25, 2019, and Korean Patent Application No. 10-2019-0069452, filed Jun. 12, 2019, the contents of which are all hereby incorporated by reference herein in their entirety.

TECHNICAL FIELD

The present invention relates to a method for controlling and managing front door refrigerator using application installed in a recording medium.

BACKGROUND ART

Recently, a delivery service for delivering articles to a predetermined place has been activated. Particularly, when the article is fresh food, a refrigerator or a heating cabinet is provided in the delivery vehicle to prevent the food from being spoiling or getting cold so that the food is stored and delivered.

It is common that food is generally delivered in packaging to be maintained in a cooled or warm state. The packaging material is made of environmental pollutants such as Styrofoam, thereby creating a social atmosphere to reduce usage.

If the user is at home at the delivery time, the delivery person and the user may face-to-face to receive food, but when the user is not at home or when the delivery time is too early or too late, it is difficult for the delivery person and the user to face-to-face to receive the food.

Therefore, even if the delivery person and the user do not directly face each other, the food may be delivered, and there is a need to not spoil or cool the food until it is finally delivered to the user.

In order to solve this problem, recently, the refrigerator is installed at the entrance (front door) at a predetermined place, so that the delivery person keeps the food in the refrigerator to keep the food in a fresh state, and the user may access the refrigerator at a convenient time to receive the food.

In relation to a front door refrigerator, the prior art has been disclosed as follows.

1. Patent Publication No (Publication Date): 10-2011-0033394 (Mar. 31, 2011)
2. Title of Invention: REFRIGERATOR ATTACHED TO ENTRANCE GATE AND MAIN DOOR Recently, various home appliances provided at home are connected to a user's portable terminal through the Internet or a home network, so that the user can freely control the operation of the indoor home appliance even from a remote location using the portable terminal.

Therefore, like other home appliances provided in the home, there is a need to enable the user to control the operation of the front door refrigerator from the remote location, and to enable mutual information exchange remotely between the front door refrigerator and the user's portable terminal.

DISCLOSURE OF THE INVENTION

Technical Problem

The present invention provides a method for controlling and managing a front door refrigerator using an application installed in a recording medium including a mobile device so that the front door refrigerator as described above is remotely controlled and managed through a mobile device.

Technical Solution

A method for controlling and managing a front door refrigerator using an application installed in a recording medium according to an embodiment of the present invention for achieving the above object includes: allowing a user to log in an application for controlling the front door refrigerator, which is installed in a recording medium comprising a mobile device; displaying a main screen comprising a menu display area on a display portion of the mobile device; and selecting an incoming information confirmation menu among a plurality of execution menus displayed on the menu display area, wherein, when the incoming information confirmation menu is selected, incoming information of an article that incomes at present into the front door refrigerator is output on the display portion of the mobile device.

Advantageous Effects

According to the method for controlling and managing the front door refrigerator using the application installed in the recording medium having the above configuration, the following effects are obtained.

First, there may be an advantage of being able to receive the products or articles ordered through the Internet in the front door refrigerator without having to directly face the delivery person, including the delivery driver.

Second, since the profile input for the user registration, which is capable of opening or closing the door of the front door refrigerator may be transmitted through the portable terminal and transmitted to the controller of the front door refrigerator, there may be advantage in that there is no need to stand outside the entrance for a long time for the user registration.

Third, there may be the advantage in that it is possible to check the parcel information that has arrived in the front door refrigerator through the application according to the present invention.

Fourth, there may be the advantage of being able to directly transmit the encryption code or the authentication number for opening the door of the refrigerator to the courier through the parcel information input function.

Fifth, there may be the advantage in that it is possible to turn on/off the front door refrigerator, open or close the door of the refrigerator, turn on/off the refrigeration function, reserve the refrigeration time, and check the internal condition of the refrigerator from the remote location.

BRIEF DESCRIPTION OF THE DRAWINGS

FIG. 16 is a view illustrating a screen displayed when a parcel information confirmation menu is selected.

FIGS. 17 to 19 are views illustrating a screen displayed when a parcel information input menu is selected.

FIGS. 29 to 30 are views illustrating a screen displayed when a menu of the front door when a refrigerating reservation menu is selected.

MODE FOR CARRYING OUT THE INVENTION

Figure 1:
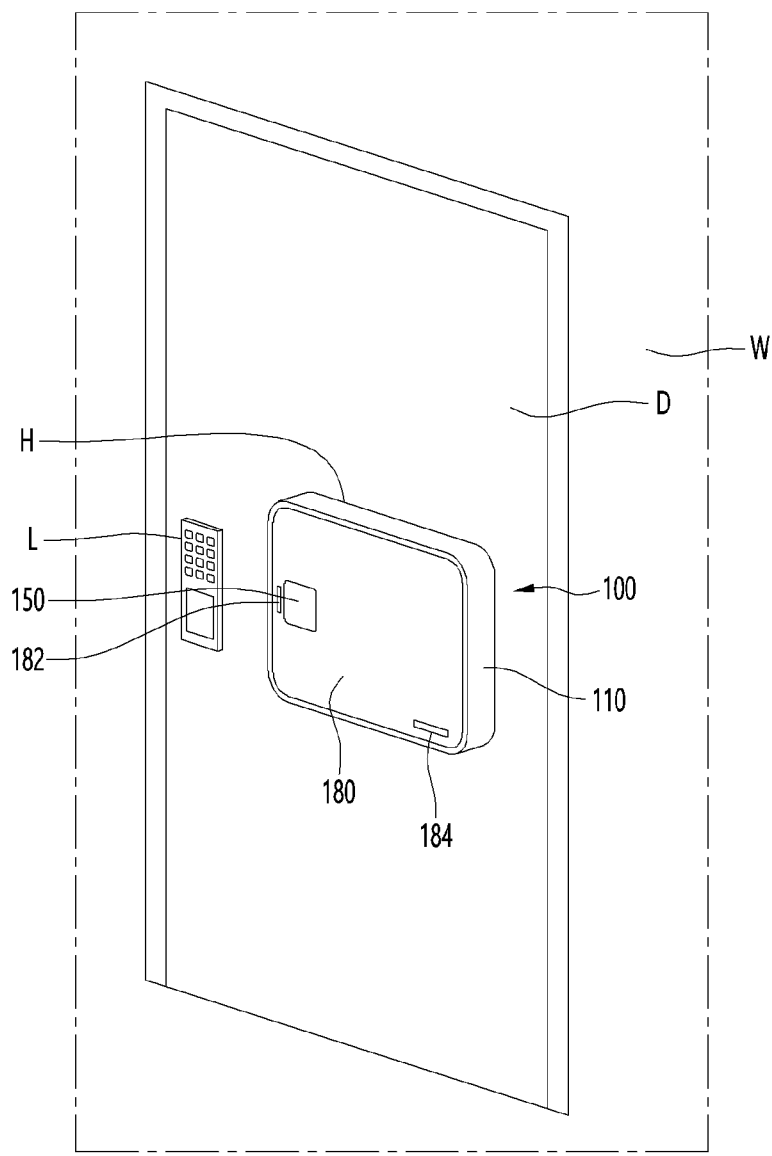
FIG. 1 is a view illustrating a state in which a front door refrigerator is installed on a door for an entrance according to an embodiment of the present invention.

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. The terms are merely used to distinguish the corresponding component from other components, and do not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

"User" used in this specification means a consumer who purchases an article through the Internet, and should be interpreted as meaning the owner of a front door refrigerator and his/her family.

In addition, the purchased article or ordered article should be construed to mean all other types of articles, including fresh food.

In addition, a delivery person, such as a parcel driver and a postman, should be interpreted as meaning a person who has been given task and authority to deliver the article or goods ordered by the user to a storage compartment of the front door refrigerator.

The refrigerator of the present invention may be installed to stand upright on the floor of an installation space, fixed to a door of a building, a wall of a building, or a surface of a separate support, or installed to be fixed while passing through the door, wall or support.

It is advantageous to configure a refrigeration cycle that is not heavy so as to reduce damage caused by falling from a place at which the refrigerator is installed. For example, a refrigeration cycle using a small compressor or a refrigeration cycle using a thermoelectric element module may be configured.

Since the thermoelectric element module makes less noise than the compressor, when installing the refrigerator in a space that requires low noise, such as a bedroom, a study room, a living room, a door of a building, or a wall of a building, the refrigeration cycle using the thermoelectric module is advantageous.

The thermoelectric module may be used as a refrigerator or a heating cabinet when compared to the refrigeration cycle using the compressor.

As another example, a front door refrigerator of the present invention may be used as a simple delivery box in which the thermoelectric module is not installed.

In the present invention, an input portion is provided at one side of the door or the cabinet and also is provided for inputting information. The input portion may include one or more input means or sub-input portions.

In the present invention, the display provided with the input portion may include one or more input portions.

In the present invention, the input portion and the display may be provided separately from each other.

An electronic controller (processor) of the present invention may control at least a portion of the input portion to be in an input activated state when a predetermined condition is satisfied, and to switch at least a portion of the input portion to an input inactive state when another predetermined condition is satisfied.

The controller may control the input portion to be in at least one state of i) all input activation, ii) partial input activation, or iii) all input inactivation.

Here, the input activation state is defined as a state in which information related to the operation of the refrigerator is capable of being input through the input portion, and the input deactivation state is defined as a state in which the information is not capable of being input.

The refrigerator of the present invention may include a cabinet forming a storage compartment, a door for opening or closing the storage compartment, an input portion for inputting information related to the operation of the refrigerator, and the controller.

Also, "the information related to the operation of the refrigerator" is defined as information input through the input portion of the refrigerator. For example, the information includes a command to increase or decrease in notch temperature of the refrigerator, a command to apply or cut off a voltage to an electric element or component of the refrigerator, or a command to increase or decrease in voltage, sensing information detected by a sensor installed in the refrigerator, etc.

The input portion means a means for inputting information related to an operation of the refrigerator, which includes at least one of a button through which a command related to the operation of the refrigerator are input, a product information recognizer capable of recognizing unique information about a product, such as a code scanner including a barcode reader that recognizes a barcode of the product and a QR code reader that recognizes a QR code of the product, a communication module or element (e.g., a remote controller signal receiver, NFC signal receiver, etc.) that receives a signal from an external device such as a remote controller including a remote controller or a mobile terminal including a mobile phone, an image capturing portion including a camera for recognizing an image of an object including a person, a microphone that recognizes a sound signal including human voice, a motion signal detection portion that is capable of detecting a person's motion, a proximity signal detection portion (or distance signal detection portion) that is capable of detecting the proximity of a person, a touch input portion that is capable of detecting a human touch action, a biometric information detection portion that recognizes biometric information such as human vein information, iris information, or DNA information, a vibration signal detection portion that detects a user knocking on a door of the refrigerator (e.g., a knock signal detection portion), or a timer that measures an elapsing time.

The refrigerator is provided with a door, and the door may be configured to simultaneously perform functions of a first door (hereinafter, referred to as an "incoming door") that opens or closes a storage compartment for incoming of an article into the refrigerator, and a second door (hereinafter, referred to as an "outgoing door") that opens or closes the storage compartment for outgoing of the article from the refrigerator.

The refrigerator may include a plurality of doors, and the plurality of doors may be configured to include at least the incoming door and the outgoing door. For example, the incoming door may be provided at a front side of the refrigerator, and the outgoing door may be provided at a rear side of the refrigerator.

As another example, both the incoming door and the outgoing door may be provided at the front side or the rear side of the refrigerator.

In this case, it may be understood to mean that both the incoming door and a separate outgoing door that is distinguished from the incoming door are provided at the front side of the refrigerator, and both the incoming door and a separate outgoing door that is distinguished from the incoming door are provided at the rear side of the refrigerator.

The refrigerator includes an input portion, and the input portion may be configured to simultaneously perform function of a first input portion (hereinafter, referred to as an "incoming input portion") for inputting information for incoming of an article into the refrigerator, and a second input portion for inputting information for outgoing of an article (hereinafter, referred to as an "outgoing input portion").

The refrigerator may include a plurality of input portions, and the plurality of input portions may be configured to include at least the input portion for incoming and the input portion for outgoing.

According to the present invention, since a person (e.g., a delivery person) other than the user may put an article in the user's refrigerator, after an article incoming person (delivery person) performs incoming authentication to put the article into the refrigerator, a situation in which the incoming article is taken out by the article incoming person by performing the incoming authentication again may be prevented. Embodiments for solving this problems will be described below.

When the information inputted through the input portion matches set "incoming reference information (=incoming authentication information)", the refrigerator controller performs the incoming authentication in which lock of the door is released, and after the door is unlocked, the "incoming reference information" may be controlled to any one of deletion, initialization, or resetting.

On the other hand, the refrigerator controller may control the refrigerator so that the incoming authentication in which information for incoming is input through the input portion and outgoing authentication in which information for outgoing is inputted through the input portion are performed, and the incoming authentication and the outgoing authentication may be controlled to be performed in different methods. An embodiment of differently controlling the incoming authentication method and the outgoing authentication method includes the following three methods.

First, when the information input by the refrigerator controller for incoming through the input portion matches the set "incoming reference information" (e.g., information related to the article being put), the incoming authentication in which the lock of the door is released may be controlled to be performed, and when the information input for outgoing through the input portion matches the "outgoing reference information set differently from the incoming reference information" (e.g., user information registered in relation to the refrigerator), the outgoing authentication that unlocks the door may be controlled to be performed.

Second, the refrigerator has a plurality of input portions, and an incoming input portion (e.g., an article information recognizer such as a barcode reader or a QR code reader) and an outgoing input portion (e.g., a communication element that receives a signal from an external device such as an NFC signal recognizer) may be provided to be distinguished from each other.

Third, the refrigerator includes an incoming mode (e.g., a storage button) in which information for incoming can be input through the input portion and an incoming mode (e.g., a pickup button) in which information for incoming is capable of being input through the input portion, and when a predetermined condition is satisfied, the controller may control the refrigerator so that only the outgoing mode is activated.

The refrigerator controller may control a method of activating the incoming input portion and a method of activating the outgoing input portion to be different from each other.

For example, when the controller determines that the storage compartment is empty, the incoming input portion may be activated. In addition, when it is determined that the article exists in the storage compartment above a preset reference value, the outgoing input portion may be controlled to be activated.

The presence or absence of the article or an amount of article in the refrigerator may be determined through a camera in the refrigerator. Alternatively, after the incoming authentication is performed, and the door lock is released, it is possible to control the refrigerator so that only the outgoing mode is activated.

When the outgoing mode is selected, the controller may control the refrigerator so that only a pre-registered refrigerator user may perform the outgoing authentication. For example, the controller may guide the user to input a preset password in order to proceed with the outgoing authentication.

The present invention may include at least one of the embodiments described above.

In the present invention, the "incoming mode" or "storage mode" may be defined as a control mode that guides the article incoming person so that the article is stored in the storage compartment, and the "outgoing mode" or "pickup mode" may be defined as a control mode that guides the article outgoing person so that the article is stored in the storage compartment.

Figure 2:
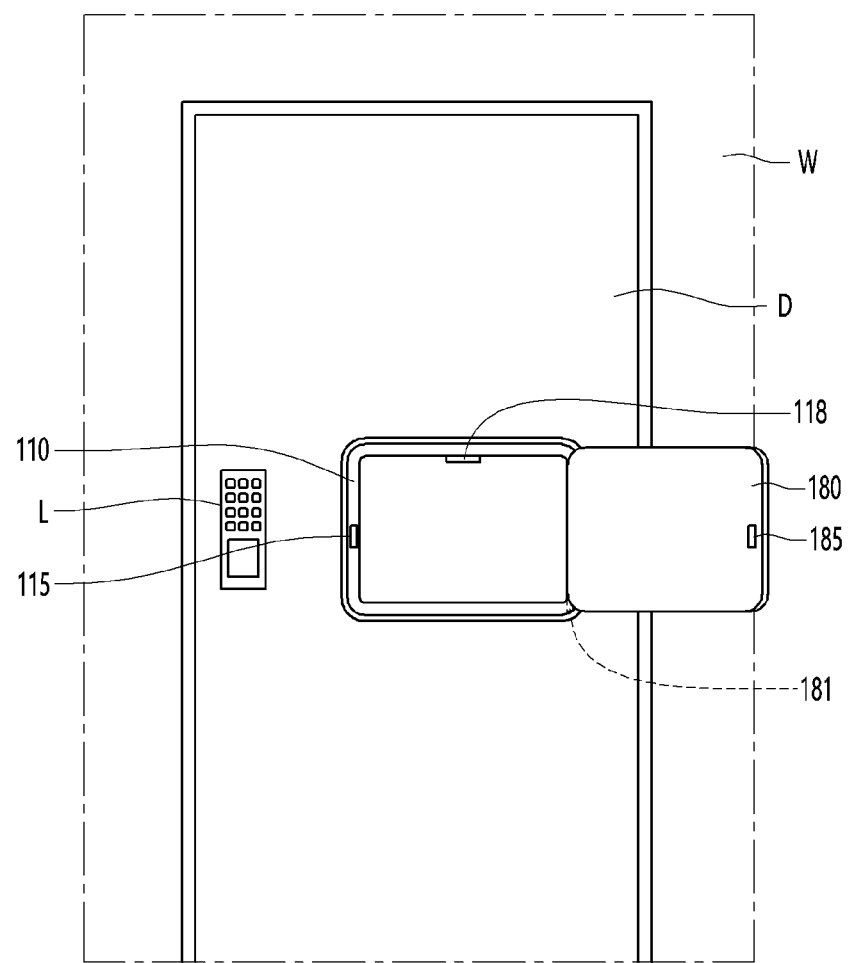
FIG. 2 is a view illustrating a state in which an outer door is opened in the state in which the front door refrigerator is installed on the door for the entrance.
Figure 3:
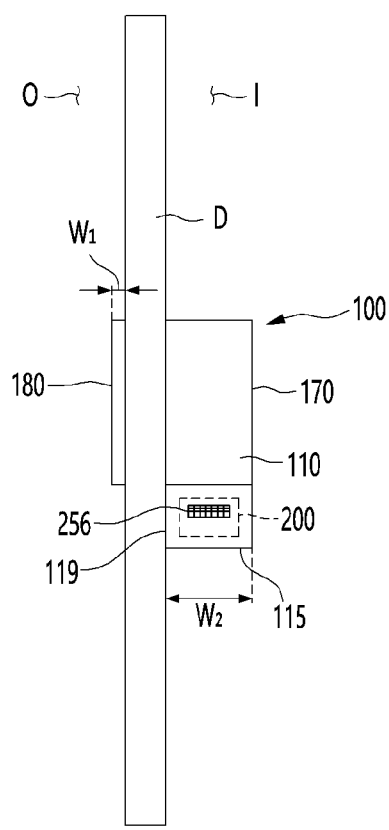
FIG. 3 is a schematic view illustrating configurations of an indoor-side and an outdoor-side based on the door in the state in which the front door refrigerator is installed on the door for the entrance.

FIG. 1 is a view illustrating a state in which a front door refrigerator is installed on a door for an entrance according to an embodiment of the present invention, FIG. 2 is a view illustrating a state in which an outer door is opened in the state in which the front door refrigerator is installed on the door for the entrance, and FIG. 3 is a schematic view illustrating configurations of an indoor-side and an outdoor-side based on the door in the state in which the front door refrigerator is installed on the door for the entrance.

Referring to FIGS. 1 to 3, a front door refrigerator 100 according to an embodiment of the present invention may be installed on a door D for an entrance of a home or office. The door D for the entrance is installed on a wall W. A door lock L for opening the door may be provided in the door D for the entrance.

An opening H is formed in the door D for the entrance, and the front door refrigerator 100 may be inserted into the opening H to extend to an indoor-side I and an outdoor-side O. The direction will be defined. With respect to the front door refrigerator 100, the outdoor-side O is defined as a "front side" and the indoor-side I is defined as a "rear side".

The front door refrigerator 100 includes a cabinet 110 that forms an outer appearance thereof.

For example, the cabinet 110 may have a substantially rectangular parallelepiped shape and be disposed to pass through the opening H. A sealer 160 (see FIG. 6) is provided between the opening H and an outer surface of the cabinet 110 so that the cabinet 110 is in close contact with the opening H.

A storage compartment 110a capable of storing food is formed inside the cabinet 110. A camera 118 may be provided in the storage compartment 110a. For example, the camera 118 may be disposed above the storage compartment 110a. The camera 118 may photograph the food stored in the storage compartment 110a and upload the captured image to a delivery application.

For this, the front door refrigerator may be provided with a communication module capable of communicating with the outside. For example, the communication module may include a Wi-Fi device.

The storage compartment 110a may be opened at the indoor-side I and the outdoor-side O.

In detail, the front door refrigerator 100 may be provided at one side (outdoor-side) of the storage compartment 110a and may further include an outdoor-side door 180 capable of opening or closing the storage compartment 110a. The outdoor-side door 180 may be disposed at the outdoor-side O and may be, for example, a door opened by a food delivery person in order to put the food therein. The outdoor-side door 180 may be in a normally locked state to prevent an opening of any door.

The front door refrigerator 100 may be provided at the other side (indoor-side) of the storage compartment 110a and further include an indoor-side door 170 capable of opening or closing the storage compartment 110a. The indoor-side door 170 may be disposed at the indoor-side (I) and may be a door opened by a user in order to collect food.

The outdoor-side door 180 and the indoor-side door 170 may be rotatably coupled to the cabinet 110.

The outdoor-side door 180 includes a hinge 181 coupled to the cabinet 110 and a latch 185 hooked on the cabinet 110. The hinge 181 may be provided at one side of both left and right sides of the outdoor-side door 180, and the latch 185 may be provided on the other side. The latch 185 may be provided on a rear surface of the outdoor-side door 180.

The cabinet 110 may further include a latch coupling portion 115 hooked with the latch 185.

A pressing portion 182 capable of being pressed to open the outdoor-side door 180 is provided on a front surface of the outdoor-side door 180. The pressing portion 182 is disposed in front of the latch 185 to transmit pressing force to the latch 185, and the latch 185 is released from the hook with the latch coupling portion 115 by the transferred the pressing force (push-up button manner).

Since the configuration of the indoor-side door 170 is similar to that of the outdoor-side door 180, a hinge, a latch, and a pressing portion may also be provided in the indoor-side door 170.

A code scanner 184 capable of reading information on delivered food may be provided on a front surface of the outdoor-side door 180. The code scanner 184 may include a barcode scanner or a QR code scanner.

When a food delivery person brings food information (code information) provided on food or a food container to the code scanner 184, the front door refrigerator 100 recognizes that the food is scheduled to be delivered and release the locked state of the outdoor-side door 180. In this state, the delivery person may open the outdoor-side door 180 to store the food.

A display portion 150 may be provided on the outdoor-side door 180. Information that is necessary for use of the front door refrigerator 100 is displayed on the display portion 150.

For example, the display portion 150 may display a "guide comment" for the delivery person. For example, the guide comment may include a comment such as "Please recognize barcode or QR code of food to code scanner".

An input portion for inputting a password or an authentication number may be displayed on the display portion 150. The delivery person may release the lock state of the outdoor-side door 180 by inputting the password promised in advance with the user into the input portion.

In summary, the delivery person allows the food code to be recognized to the code scanner 184 or inputs a password or authentication number to unlock the outdoor-side door 180, and thus, after opening the outdoor-side door 180, the food is stored in the storage compartment 110a.

The cabinet 110 may extend toward the indoor-side I and the outdoor-side O through the door D. A front-rear width W2 of a portion of the cabinet 110, which extends toward the indoor-side I, may be greater than a front-rear width W1 of a portion, which extends toward the outdoor-side O.

According to such a configuration, since an area protruding from the door D toward the indoor-side I is large, and an area protruding from the door D toward the outdoor-side O is small, an area of the front door refrigerator 100, which is exposed to a space through which arbitrary people pass, may be reduced. Thus, possibility of damage to the front door refrigerator 100 may be reduced.

A front support portion 119 supported on an outer surface of the door D is formed on a lower portion of the cabinet 110 extending toward the indoor-side I. For example, the front support portion 119 may be attached to a rear surface of the door D.

A cold air supply device 200 may be provided at the lower portion of the front door refrigerator 100. Since a front surface portion of a portion in which the relatively heavy cold air supply device 200 is accommodated, that is, the front support portion 119 is supported or attached to the door D, the front door refrigerator 100 may be stably mounted on the door D.

Figure 4:
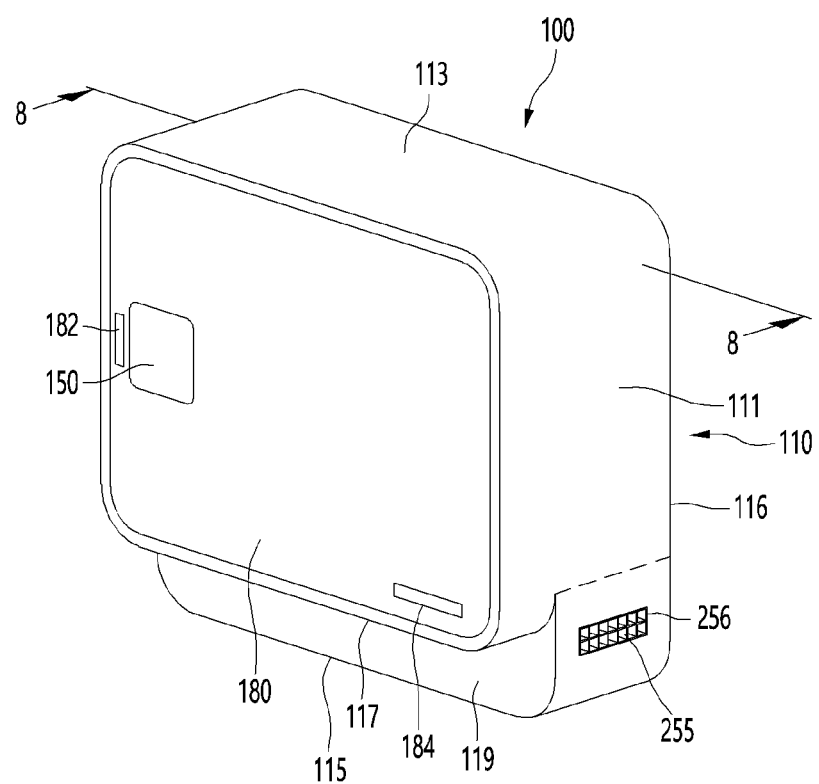
FIG. 4 is a front perspective view illustrating a configuration of the front door refrigerator according to an embodiment of the present invention.
Figure 5:
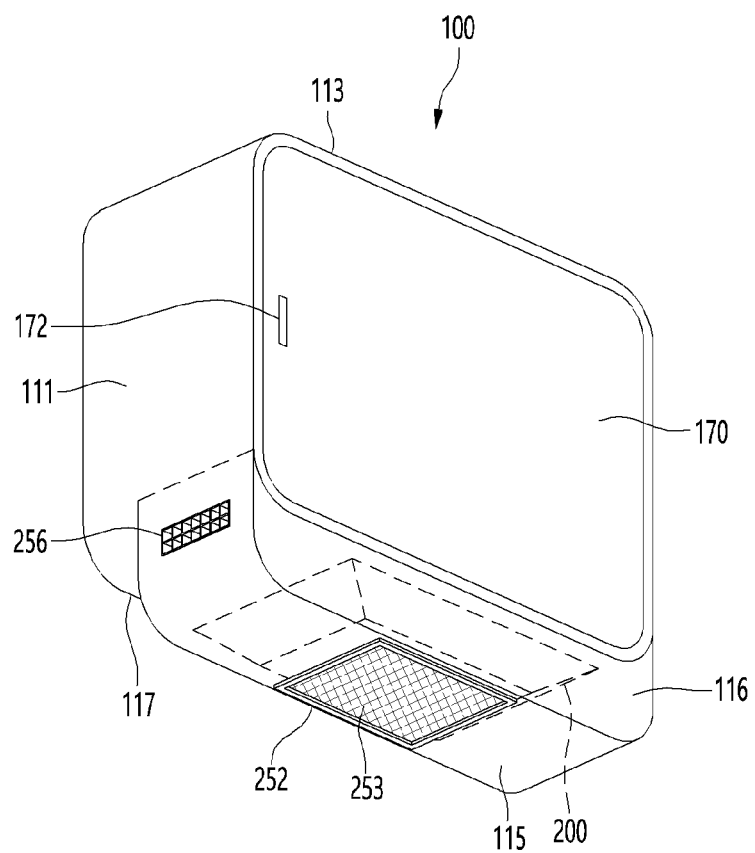
FIG. 5 is a rear perspective view illustrating a configuration of the front door refrigerator according to an embodiment of the present invention.
Figure 6:
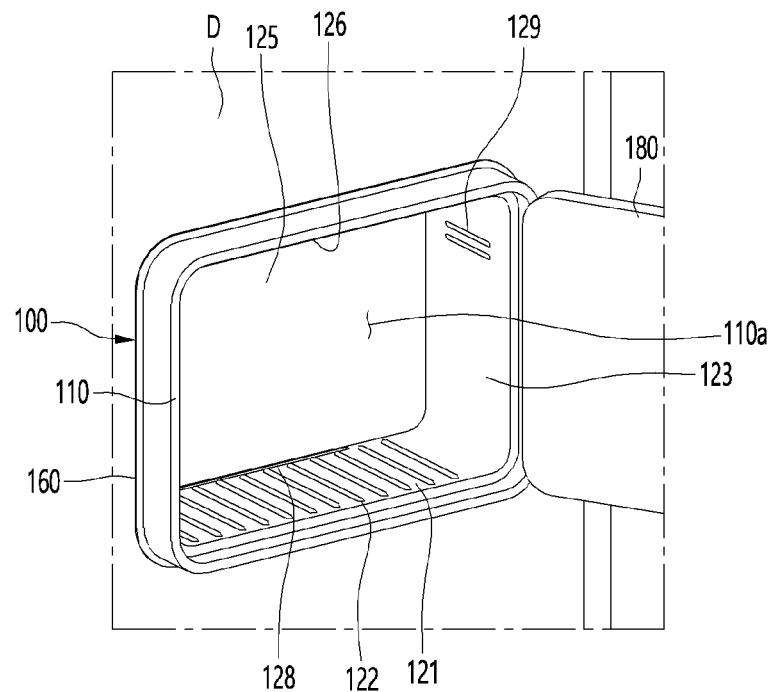
FIG. 6 is a view illustrating a shape of an inner storage compartment of the front door refrigerator according to an embodiment of the present invention.

FIG. 4 is a front perspective view illustrating a configuration of the front door refrigerator according to an embodiment of the present invention, FIG. 5 is a rear perspective view illustrating a configuration of the front door refrigerator according to an embodiment of the present invention, and FIG. 6 is a view illustrating a shape of an inner storage compartment of the front door refrigerator according to an embodiment of the present invention.

Referring to FIGS. 4 to 6, the front door refrigerator 100 according to an embodiment of the present invention includes a cabinet 110 forming an outer appearance thereof. The cabinet 110 includes two cabinet side surface portions 111, a cabinet top surface portion 113 connecting upper portions of the two cabinet side surface portions 111 to each other, and a cabinet bottom surface portion 115 forming a bottom surface of the cabinet 110, and a cabinet rear surface portion 116.

The cabinet 110 further includes a front support portion 119 extending upward from a front end of the cabinet bottom surface portion 115 to be supported or attached to the rear surface of the door D. A cold air supply device 200 may be disposed at a rear side of the front surface support portion 119.

The cabinet 110 further includes a storage compartment bottom surface portion 117 extending forward from an upper end of the front surface support portion 119 to form a bottom surface of the storage compartment 110a.

According to the configuration of the cabinet 110, the cabinet 110 may be configured to have an "L" shape. In detail, In detail, the cabinet 110 may be understood to include a first case forming a storage compartment having a hexahedral shape and a second case which extends downward from a rear side of the first case and on which the cold air supply device 200 is installed. The first and second cases may be integrated with each other.

A dissipated heat discharge portion 255 through which external air passing through the heat dissipation portion of the cold air supply device 200 is discharged is formed at a lower portion of the cabinet side surface portion 111. A discharge grille 256 may be coupled to the dissipated heat discharge portion 255.

Doors 170 and 180 may be coupled to both sides of the cabinet 110, respectively. An opening is formed at each of both ends of the cabinet 110, and the doors 170 and 180 may be coupled to the openings, respectively.

The doors 170 and 180 include an outdoor-side door 180 provided on an outdoor-side end of the cabinet 110 and an indoor-side door 170 provided on an indoor-side end of the cabinet 110. The outdoor-side door 180 may be a door that is openable by a delivery person. After inputting a password or recognizing an article, the delivery person may open the outdoor-side door 180 to put food into the storage compartment 110a.

The user may open the indoor-side door 170 to take out the food stored in the storage compartment 110a. The structure of the indoor-side door 170 is similar to that of the outdoor-side door 180. The indoor-side door 170 may be provided with a pressing portion 172 this is capable of being manipulated to open the door. The user may open the indoor-side door 170 by pressing the pressing portion 172. However, the indoor-side door 170 is a door disposed at the indoor-side and does not require locking because only a user is accessible. Thus, there may be no need for an action (password input, product recognition, etc.) to release the locking to open the outdoor-side door 180.

A cold air supply device 200 may be provided at the lower portion of the cabinet 100. The cold air supply device 200 may be installed in a space defined by both lower sides of the cabinet side surface portion 111, the cabinet bottom surface portion 115, the front surface support portion 119, and the cabinet rear surface portion 116.

An external air inflow portion 252 for allowing external air to flow into the cold air supplying device 200 is formed in the cabinet bottom surface portion 115. The air suctioned in through the external air inflow portion 252 may be discharged through the dissipated heat discharge portion 255 via a heat dissipation fan 280 and a heat sink 220 of the cold air supply device 200. An inflow grille 253 may be installed in the external air inflow portion 252. It may be understood that the external air inflow portion 252 and the dissipated heat discharge portion 255 are formed in an outer wall of the cabinet 110.

The storage compartment 110a may be defined by an inner wall of the cabinet 110. In detail, the inner wall of the cabinet 110 includes a storage compartment lower wall 121 forming a seating surface on which food is placed, a storage compartment sidewall 123 extending upward from both sides of the storage compartment lower wall 121, a storage compartment upper wall 126 forming a top surface of the storage compartment 110a and connecting an upper portion of the storage compartment sidewall 123, and a storage compartment rear wall 125 connecting a rear portion of the storage compartment sidewall 123.

The storage compartment 110a may be configured to form a substantially hexahedral space by the storage compartment lower wall 121, the storage compartment sidewall 123, the storage compartment upper wall 126, and the storage compartment rear wall 125. The storage compartment sidewall 123 forms one surface of a second passage duct 105 (see FIG. 8).

The storage compartment lower wall 121 may be provided with a rib 122 protruding upward, and the rib 122 may extend forward and backward and be provided in plurality, which are arranged in left and right directions. Food is placed at an upper side of the plurality of ribs 122 to prevent the food from being slid.

A cold air inflow hole 128 for allowing the cold air inside the storage compartment 110a to return to the cold air supply device 200 is formed in the storage compartment lower wall 121. For example, the cold air inflow hole 128 may be formed at a rear side of the storage compartment lower wall 121.

A cold air discharge hole 129 for supplying the cold air generated by the cold air supply device 200 to a side of the storage compartment 110a is formed in the storage compartment sidewall 123. The cold air generated in the cold air supply device 200 may be supplied to the side surface portion of the storage compartment 110a by the configurations of the cold air inflow hole 128 and the cold air discharge hole 129, and then be returned to the cold air supply device 200 through a rear lower portion.

A camera 118 capable of photographing food put into the storage compartment 110a may be installed on the upper wall 126 of the storage compartment 110a.

Figure 7:
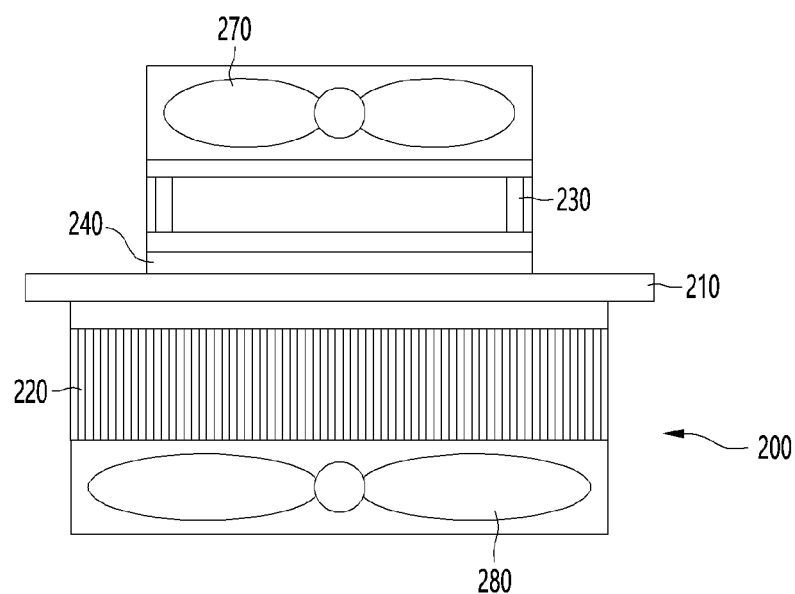
FIG. 7 is a view illustrating a configuration of a cold air supply device according to an embodiment of the present invention.
Figure 8:
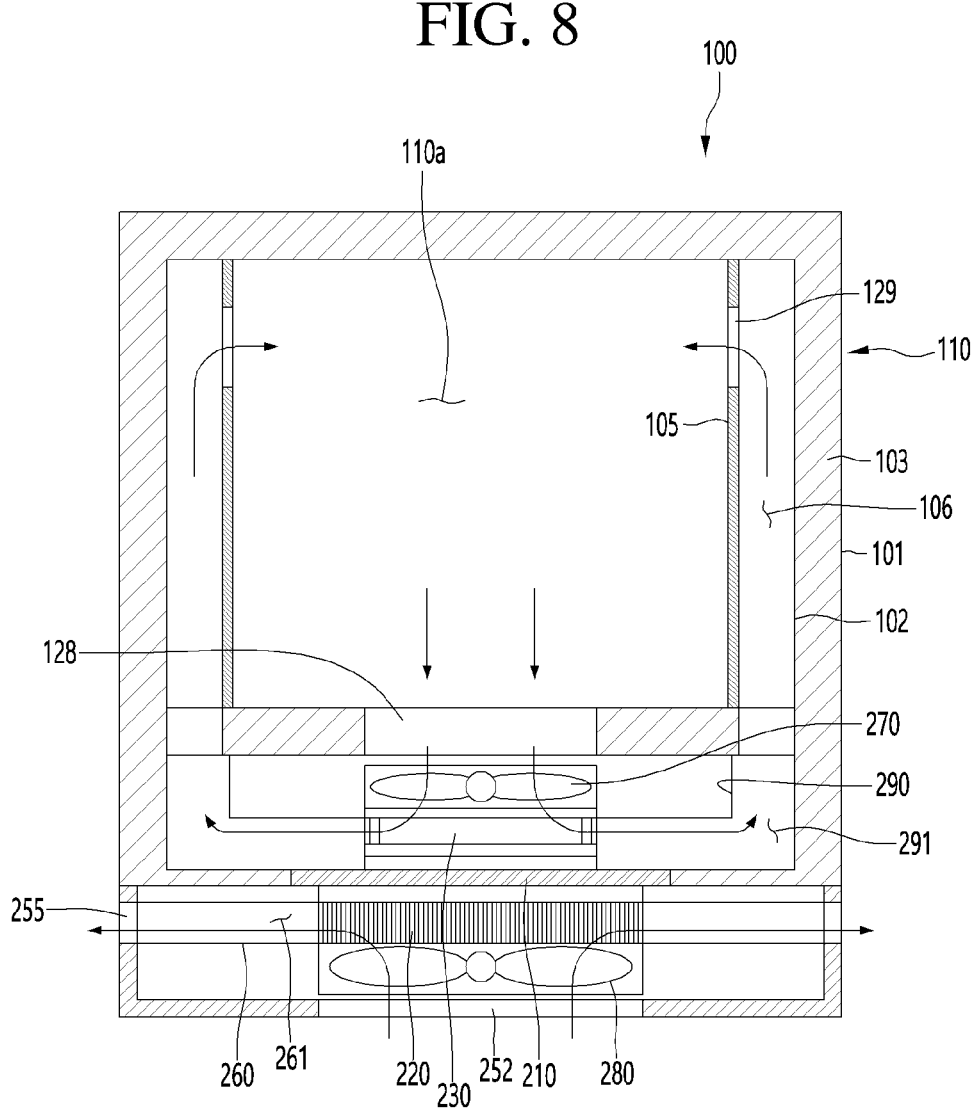
FIG. 8 is a cross-sectional view taken along line 8-8 of FIG. 4.
Figure 9:
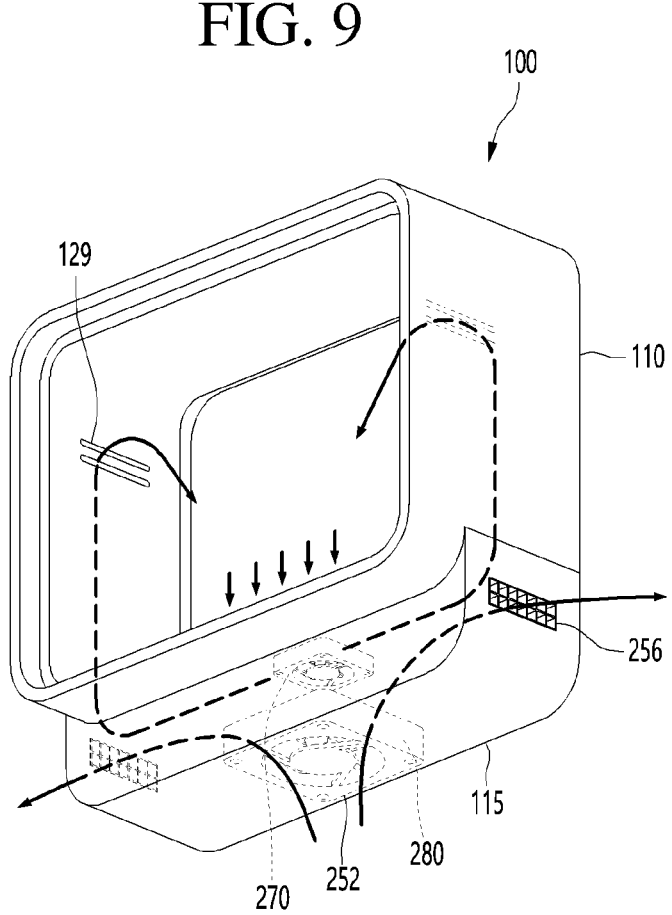
FIG. 9 is a view illustrating a state in which cold air supply and heat dissipation are performed in the front door refrigerator according to an embodiment of the present invention.

FIG. 7 is a view illustrating a configuration of the cold air supply device according to an embodiment of the present invention, FIG. 8 is a cross-sectional view taken along line 8-8 of FIG. 4, and FIG. 9 is a view illustrating a state in which cold air supply and heat dissipation are performed in the front door refrigerator according to an embodiment of the present invention.

Referring to FIGS. 7 to 9, the cold air supply device 200 according to the embodiment of the present invention is installed at the lower portion of the cabinet 100 and is provided at a lower portion of the storage compartment 110a to form a cold air passage and a heat dissipation passage.

The cold air supply device may include a thermoelectric module for generating cold air. Since the front door refrigerator 100 is not provided with a component for driving a refrigeration cycle, for example, a high noise generation source such as a compressor, and thus, noise generation during the operation of the refrigerator 100 may be reduced.

Since the thermoelectric module is configured to be relatively lightweight, it is possible to reduce a weight of the front door refrigerator 100, which needs to be stably installed on the door D for the entrance.

The thermoelectric module 200 includes a thermoelectric element, and the thermoelectric element refers to an element that implements cooling and heat generation using a Peltier effect. When a heat absorption-side of the thermoelectric element is disposed to face the storage compartment 110a, and a heat generation-side of the thermoelectric element is disposed to face the lower portion of the refrigerator 100, the storage compartment 110a may be cooled through an operation of the thermoelectric element.

In detail, the thermoelectric module 200 includes a module body 210 to which the thermoelectric element is coupled and which has a rectangular plate shape, a cold sink 230 provided at one side of the module body 210 to be heat-exchanged with the cold air of the storage compartment 110a, and a heat sink 220 provided at the other side of the module body 210 to be heat-exchanged with external air.

The one side of the module body 210 is a direction toward the storage compartment 110, that is, an upper side with respect to the thermoelectric module 200, and the other side is a direction toward the outside of the refrigerator 100, that is, a lower side.

The cold sink 230 is disposed to be in contact with the heat absorption portion of the thermoelectric element, and the heat sink 220 is disposed to be in contact with the heat generation portion of the thermoelectric element. The heat absorption portion and the heat generation portion of the thermoelectric element may have shapes that are in surface contact with each other to form opposite surfaces.

In the thermoelectric module 200, heat has to be rapidly dissipated from the heat generation portion of the thermoelectric element, so that the heat is sufficiently absorbed into the heat absorption portion of the thermoelectric element. Thus, a heat exchange area of the heat sink 220 may be larger than a heat exchange area of the cold sink 230.

Each of the heat sink 220 and the cold sink 230 may include a base that is in contact with the thermoelectric element and a heat transfer fin coupled to the base.

The thermoelectric module 200 further includes a module insulator 240 installed between the cold sink 230 and the heat sink 220. For example, the module insulator 240 may have a quadrangular frame shape and may be disposed to surround an edge of the thermoelectric element.

A cold air circulation fan 270 may be installed at an upper side of the thermoelectric module 200 to face the storage compartment 110a so as to forcibly circulate the cold air in the storage compartment 110a. The cold air circulation fan 270 may be disposed above the cold sink 230. For example, the heat circulation fan 270 may include a centrifugal fan that suctions the cold air in the axial direction and discharges the cold air in the radial direction.

The cabinet 110 includes an outer case 101 that forms an outer appearance of the refrigerator 100, an inner case 101 that is inserted into the outer case 101 to form at least a portion of the inner wall of the storage compartment, and an insulator 103 provided between the outer case 101 and the inner case 101.

A first passage duct 290 extending from the cold sink 230 to guide a flow of the cold air is provided inside the cabinet 110.

The first passage duct 290 may be configured to extend laterally from both sides of the cold sink 230 and then extend upward. A first cold air passage 291 may be formed inside the first passage duct 290. The first passage duct 290 may be connected to a second passage duct 105.

The second passage duct 105 is provided on each of both sides of the inner case 101. The second passage duct 105 forms the storage compartment sidewall 123, and the cold air discharge hole 129 is formed at an upper portion of the second passage duct 105.

A second cold air passage 106 through which the cold air flows is formed between each of both side surfaces of the inner case 101 and the second passage duct 105. The second cold air passage 106 may extend upward from the first cold air passage 291.

When the cold air circulation fan 270 is driven, the cold air in the storage compartment 110a flows in the axial direction of the cold air circulation fan 270 through the cold air inflow hole 128, and then is heat-exchanged with the cold sink 230 so as to be cooled. The cooled cold air flows to both sides in the radial direction of the cold air circulation fan 270 and is introduced into the first cold air passage 291.

The cold air of the first cold air passage 291 may flow upward to flow into the second cold air passage 106 and then be discharged to both the sides of the storage compartment 110a through the cold air discharge hole 129.

The refrigerator 100 further includes a heat dissipation fan 280 that introduces external air to be heat-exchanged with the heat dissipation portion of the thermoelectric element. The heat dissipation fan 280 is supported on the cabinet bottom surface portion 115 and be disposed above the external air inflow portion 252. For example, the heat dissipation fan 280 may include a centrifugal fan that suctions the cold air in the axial direction and discharges the cold air in the radial direction.

A heat dissipation passage duct 260 extending from the heat sink 220 to guide a flow of external air and forming a heat dissipation passage 261 therein is provided in the cabinet 110. The heat dissipation passage duct 260 may extend laterally from both sides of the heat sink 220 and be connected to the dissipated heat discharge portion 255.

When the heat dissipation fan 278 is driven, the external air is introduced in the axial direction of the heat dissipation fan 280 through the external air inflow portion 252 and then is heat-exchanged with the heat sink 220 so as to be heated. The heated cool air may flow to both sides in the radial direction of the heat dissipation fan 270 and may be discharged from the dissipated heat discharge portion 255 to the outside of the refrigerator through the heat dissipation passage duct 260.

As power to be supplied to the front door refrigerator 100, power to be supplied to an intercom or a doorbell installed around the door D, or an indoor-side lighting source may be used.

Figure 10:
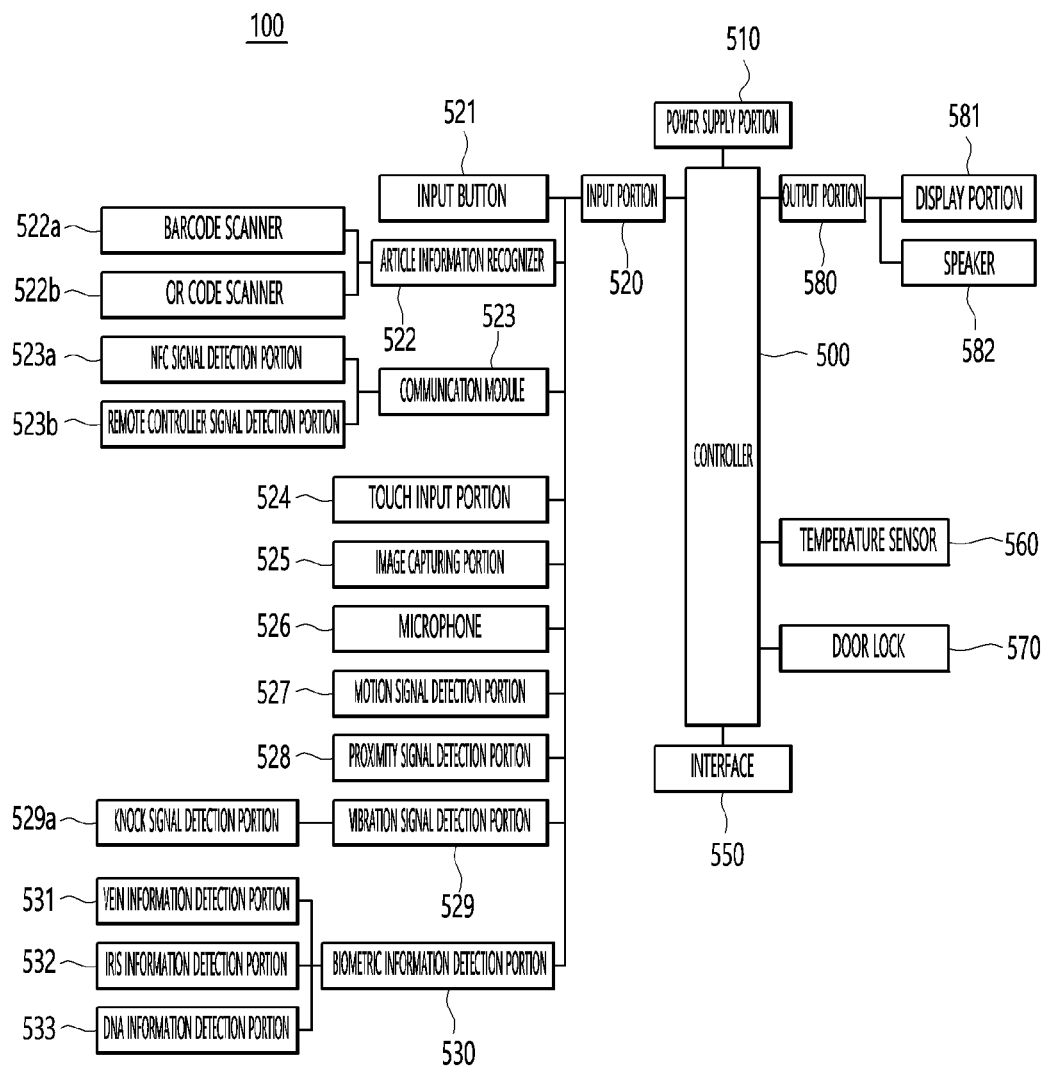
FIG. 10 is a block diagram illustrating a control configuration of the front door refrigerator, which is controlled by a control application, according to an embodiment of the present invention.

FIG. 10 is a block diagram illustrating a control configuration of the front door refrigerator according to an embodiment of the present invention.

Referring to FIG. 10, the front door refrigerator 100 according to an embodiment of the present invention includes an electronic controller (processor) 500, a power supply portion 510, an input portion 520, an output portion 580, a temperature sensor 560, a door lock 570, and an interface 550.

In detail, the input portion 520 includes a means for allowing a user or a delivery person including a delivery driver to input various information into the controller 500.

For example, the input portion 520 includes at least one or more of an input button 521, an article information recognizer 522, a communication module 523, a touch input portion 524, an image capturing portion 525, a microphone 526, a motion signal detection portion 527, a proximity signal detection portion 528, a vibration signal detection portion 529, and a biometric information detection portion 530.

The input button 521 may include a mechanical button installed around a display portion 180 of the front door refrigerator 100 and manipulated by the user or the delivery person by applying a predetermined pressure with a finger thereof. The input button 521 may include an input switch or a pressure sensor using a piezo sensor.

The input button 521 may be installed at one side of the cabinet 110 as well as the outdoor-side door 180.

The article information recognizer 522 may include any one or both of a barcode scanner 522a for recognizing a barcode printed or attached to a packaging box of a product and a QR code scanner 522b for recognizing a QR code.

The communication module 523 may include an NFC signal detection portion 523a for recognizing a signal transmitted from a near field communication (NFC) module built in a user's mobile phone and a remote controller signal detection portion 523b for recognizing a signal transmitted from the remote control.

The touch input portion 524 may include a touch screen displayed on a screen of the display portion 150. The touch input portion 524 may include a capacitive touch button that detects an input signal by detecting a change in capacitance, which occurs when a user's finger approaches or touches the screen.

The image capturing portion 525 may include an image analysis camera provided at one front side of the outdoor-side door 180 to capture a facial image of the user or delivery person or a camera (not shown) for recognizing a user's fingerprint in addition to a camera 118 mounted inside the storage compartment 110a.

The proximity signal detector 528 may include an infrared sensor (IR sensor) including an infrared transmitter and receiver.

The vibration signal detection portion 529 may include a knock signal detection portion 529a that detects vibration or sound waves generated when the user knocks the display portion 150 by hands thereof.

In addition, the biometric information detection portion 530 includes at least one of a vein information detection portion 531 detecting a user's vein map, an iris information detection portion 532 detecting a user's iris, or a DNA information detection portion 533 recognizing user's genetic information.

Also, the output portion 580 may include a display portion 581 on which an image or video information is output. The display portion 581 means a display portion 150 (see FIG. 1) provided on the outdoor-side door 180.

In addition, the output portion 580 may further include a speaker 582 for outputting various alarm sounds, multimedia playback sounds, or guide sounds. The speaker may be described as an example of a sound output portion.

The door lock 570 may include a door lock means including the above-described latch 158. The door lock 570 is provided to prevent the indoor-side door 170 or the outdoor-side door 180 from being arbitrarily opened or prevent the outdoor-side door 180 form being opened by an unauthorized person.

The temperature sensor 534 is installed in the storage compartment 110a to detect a temperature of the storage compartment 110a.

In addition, the front door refrigerator 100 may further include the interface 550, and the interface 550 functions as a passage for connecting various external devices. As an example, the interface 550 may include a wired/wireless data port to which a data storage device including a USB or an SD card is connected.

Figure 11:
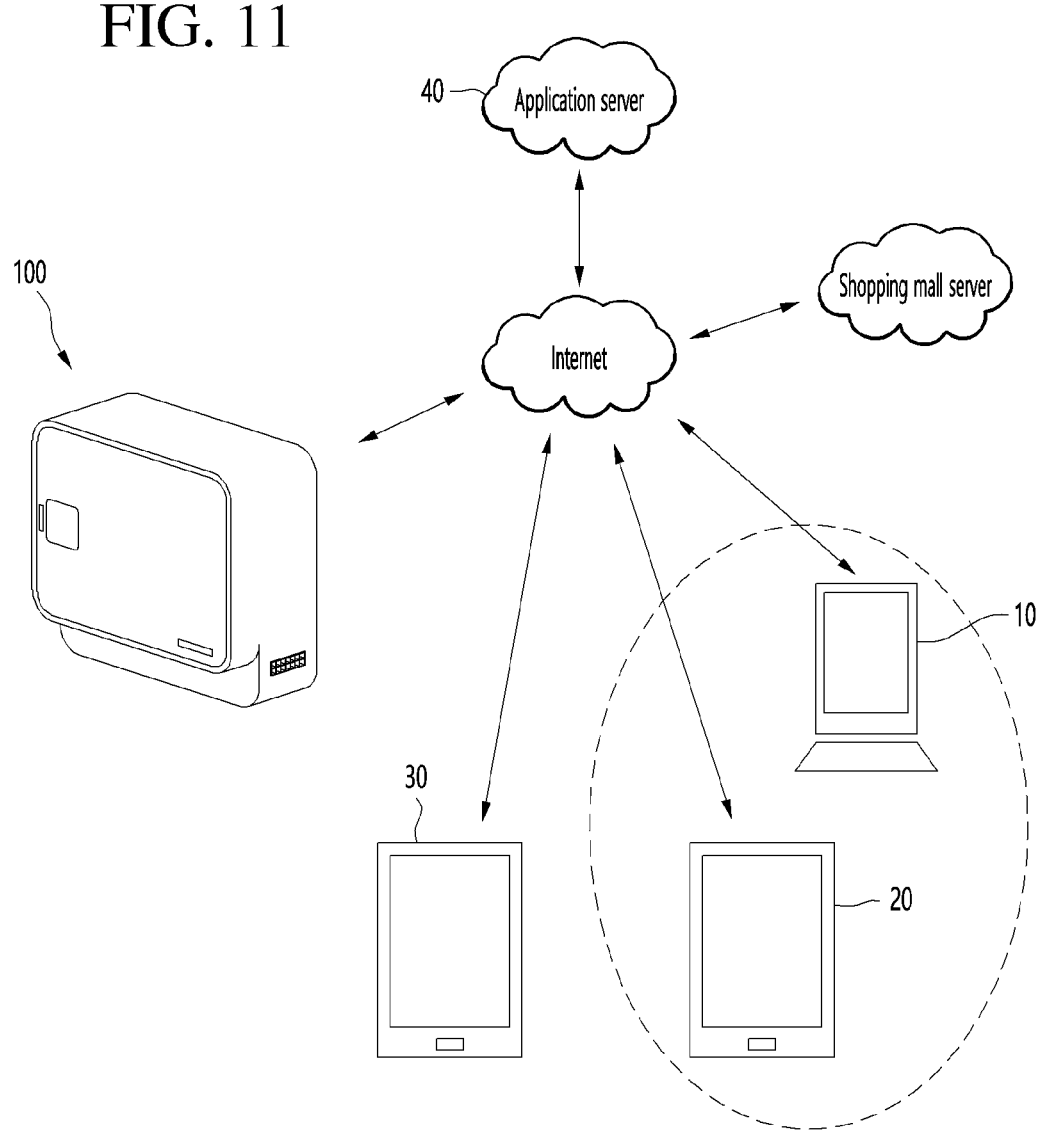
FIG. 11 is a view illustrating a network system for controlling the front door refrigerator according to an embodiment of the present invention.

FIG. 11 is a view illustrating a network system for controlling the front door refrigerator according to an embodiment of the present invention.

Referring to FIG. 11, the front door refrigerator 100 according to an embodiment of the present invention is communicatively connected to a terminal of the user through the Internet.

In addition, the user's terminal is communicatively connected to an application server 40 and a shopping mall server 50 of a control application through the Internet.

In addition, the user's terminal is communicatively connected to the controller 500 of the front door refrigerator through the Internet.

In detail, the user terminal may include a fixed terminal including the computer 10 or a mobile device 20 including a portable terminal such as a smart phone. The delivery person's terminal 30 may include a mobile device or a PDA terminal.

When the user accesses the Internet using the computer 10 or the mobile device 20 to purchase an article at a shopping mall connected to the Internet, information on the purchased article and/or authentication-related information is transmitted to the controller 100 of the front door refrigerator 100 and then is stored in a memory or a separate server connected to the controller.

That is, since information on the front door refrigerator 100 is registered in the corresponding shopping mall server, the server 50 of the corresponding shopping mall may directly transmit the information to the controller 500 of the front door refrigerator 100. For this, when the user registers for a membership in the corresponding shopping mall site, the information on the front door refrigerator 100 may need to be registered.

Alternatively, the information on the purchased article may be transmitted from the shopping mall server 50 to the user's mobile device 20. Then, the control application installed in the user's mobile device 20 may read information about the purchased article stored in the user's mobile device 20 to transmit the information to the application server 40. Then, the application server 40 may transmit the information on the purchased article and/or authentication-related information to the controller 500 of the front door refrigerator 100.

At the same time, the information and/or authentication-related information on the purchased article may be transmitted to the server of a parcel company and transmitted to the delivery person's terminal 30. The Information on the purchased article may be transmitted to the delivery company server in the form of an encryption code, for example, a barcode or QR code, and the delivery company may attach the encryption code to a packaging box of the purchased product.

In addition, the authentication-related information may be transmitted to the server of the delivery company together with the information on the purchased article and then finally transmitted to the delivery person's terminal 30 or may be transmitted to the user who purchased the article.

Alternatively, at least one or all of the encryption code and authentication-related information may be directly generated by the user. If the user directly generates the encryption code and/or authentication-related information, when the user receives a number of the delivery person's terminal 30 from the parcel company, the encryption code and authentication-related information and/or authentication-related information may be directly transmitted to the delivery person's terminal 30. This will be described in more detail with reference to the accompanying drawings.

The user may access the Internet through the computer 10 or the mobile device 20 and may access or log in to the shopping mall site or the mart site for selling goods.

The method for accessing and logging in to the shopping mall site or the mart site includes a method for directly accessing the address of the corresponding shopping mall site, or a method for logging in the control application installed in the user's mobile device 20 and then logging in the corresponding shopping mall or mart site.

Here, since the terminal 30 of the delivery person is controlled by a server of the delivery company or the post office, the terminal 30 of the delivery person may be interpreted as the same meaning as the server of the delivery company or the post office.

When the user accesses the shopping mall and purchases a desired article, information related to authentication of purchase article information may be transmitted from the server of the corresponding shopping mall to the user's mobile device 20. Then, the article information and the authentication information may be stored in the application server through the control application installed in the user's mobile device 20.

Alternatively, the article information and authentication information are directly transmitted from the shopping mall server 50 to the application server 40 through the Internet or directly transmitted from the shopping mall server 50 to the application server 40, the controller 500 for the front door refrigerator, and the server of the delivery company.

In order to transmit the information from the server of the shopping mall, in which the user logs in to purchase the article, to the controller of the front door refrigerator 100, when the user accesses the shopping mall to register for a membership, a unique number or a unique code of the front door refrigerator 100 has to be input.

The delivery person of the delivery company delivers the ordered article to the front of the front door refrigerator 100 of the user and brings the authentication information to the encryption code scanners 522a and 522b provided on the door of the front door refrigerator 100. As a result, the outdoor-side door 180 of the front door refrigerator 100 is opened so that articles is stored.

Figure 12:
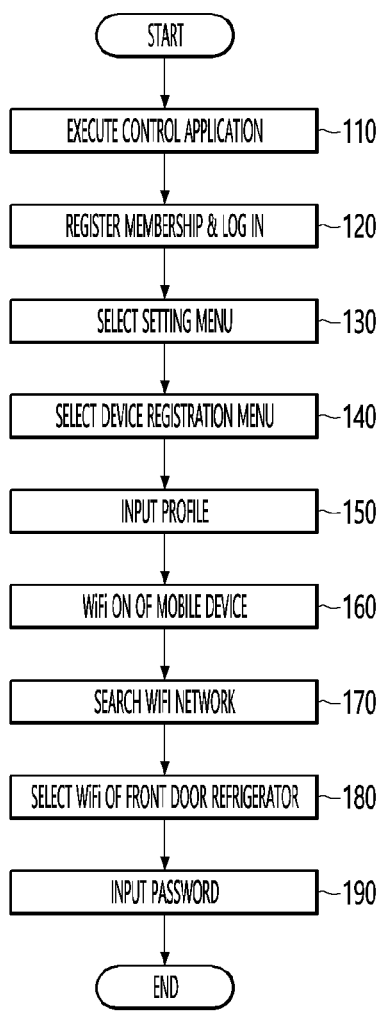
FIG. 12 is a flowchart illustrating a process of registering the front door refrigerator in a user's mobile device.

FIG. 12 is a flowchart illustrating a process of registering the front door refrigerator in the user's mobile device.

Referring to FIG. 12, in order to remotely control the front door refrigerator by executing a control application of the front door refrigerator, which is installed in the user's mobile device, first, the user's mobile device 20 and the front door refrigerator 100 are paired with each other.

First, the control application of the front door refrigerator is executed (S110) to complete membership registration and log in (S120).

After selecting a setting menu on a main screen of the application (S130), a device registration menu is selected (S140).

When the device registration menu is executed, a user's profile is input (S150). In this case, the user profile may be registered with not only the owner of the corresponding mobile device 20 but also the profile of a person who is permitted to use the front door refrigerator, i.e., persons such as a family member. The user profile may be registered with a user's name or nickname.

When the profile input is finished, Wi-Fi of the mobile device 20 is turned on (S160), and a Wi-Fi network is searched (S170). When Wi-Fi of the front door refrigerator among Wi-Fis that are listed on the screen of the mobile device 20 is selected (S180), and the number of selected Wi-Fi is input (S190), device registration, that is, the pairing between the mobile device and the front door refrigerator is completed.

Figure 13:
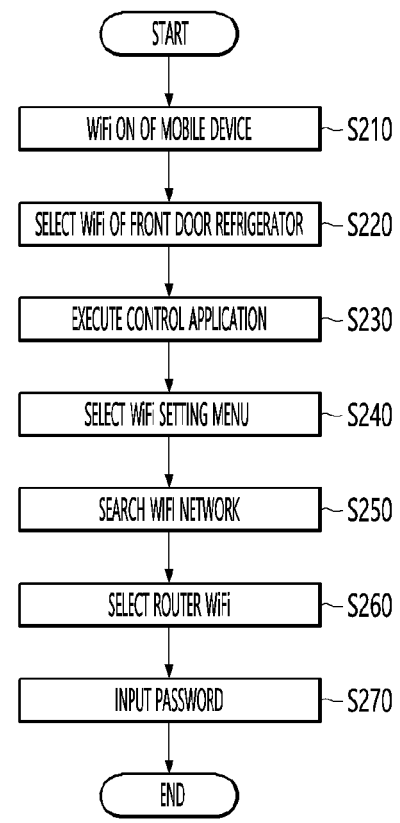
FIG. 13 is a flowchart illustrating a process of connecting Wi-Fi of the front door refrigerator to an indoor wireless router through a mobile device according to an embodiment of the present invention.

FIG. 13 is a flowchart illustrating a process of connecting Wi-Fi of the front door refrigerator to an indoor wireless router through a mobile device according to an embodiment of the present invention.

Referring to FIG. 13, first, Wi-Fi of the mobile device 20 is turned on (S210), and the Wi-Fi of the front door refrigerator among the Wi-Fis listed on the display of the mobile device 20 is selected (S220). Of course, in order to enable the search and selection of Wi-Fi of the front door refrigerator, WiFi of the front door refrigerator has to be turned on before performing this process.

In this state, the control application of the front door refrigerator is executed to log in (S230). Then, a Wi-Fi setting menu displayed on the main screen of the control application is selected (S240), and a process of searching for a Wi-Fi network is performed once more (S250).

In addition, if Wi-Fi of the indoor wireless router among the list-up Wi-Fis (S260) is selected, and a password is input (S270), Wi-Fi of the front door refrigerator 100 is connected to the indoor wireless router.

According to the above setting method, the user may be simply connected to the network by using the mobile device in an indoor space, without the need for the user to operate the screen of the front door refrigerator 100 outside the entrance.

According to an execution sequence as described above, the user's mobile device 20 and the front door refrigerator 100 are connected to each other through the router installed in the indoor space, and the user executes the control application of the front door refrigerator to remotely control the registered operation of the front door refrigerator.

In addition, since the user profile input in the device registration process is transmitted and stored from the mobile device 20 to the front door refrigerator 100, an effort of inputting the user profile through the display of the front door refrigerator 100 is reduced.

Particularly, it may be very inconvenient for the user to register and connect the device or input the user profile by touching the display of the front door refrigerator 100 outside the entrance in winter at which the weather is cold. Accordingly, since it is possible to input the profile through the mobile device 20 and transmit the profile to the controller of the front door refrigerator 100 through wireless communication, there is an advantage of improving convenience of use.

Figure 14:
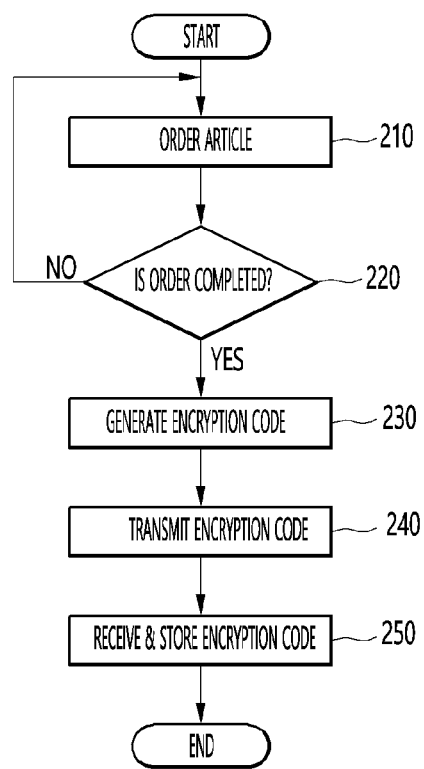
FIG. 14 is a flowchart for schematically explaining a process in which a user orders goods through the Internet, and goods information is stored in the front door refrigerator.

FIG. 14 is a flowchart for schematically explaining a process in which a user orders goods through the Internet, and goods information is stored in the front door refrigerator.

Referring to FIG. 14, a user may access the Internet through the computer 10 or the mobile device 20 and may access or log in to a shopping mall site or a mart site for selling goods.

The user may directly access a desired shopping mall using the mobile device 20, or after logging in the control application of the front door refrigerator according to the present invention, the user may access or log in the desired shopping mall or mart site.

An application server 400 for managing the control application is a means for connecting the controller 500 of the front door refrigerator 100 to the user's mobile device 20, and thus, the information of the purchased product and authentication information may be shared.

In addition, the information of the purchased product and the authentication information may be directly transmitted from a server of the corresponding shopping mall to the application server 400 through the Internet and then be received by the mobile device 20 of the corresponding user.

Alternatively, as described above, when the order information and the authentication information are transmitted from the server of the corresponding shopping mall to the mobile device 20, the controller of the mobile device 20 automatically draws the transmitted information from the control application.

Here, since the terminal 30 of the delivery person is controlled by a server of the delivery company or the post office, the terminal 30 of the delivery person may be interpreted as the same meaning as the server of the delivery company or the post office.

The user accesses the Internet through the application installed on the computer or terminal to access or log in to an on-line mall or on-line mart that sells products to be purchased and then orders a desired product (or article) (S210).

When the user selects any one of the cash transfer or card payment method and then ends the payment process, it is assumed that the order is completed (S120), and when the order is completed, an encryption code generation process is performed (S230).

Here, it is also possible to generate authentication information together with encryption code generation. The authentication information may be used as an auxiliary means to be used when a process in which the delivery person recognizes the encryption code through the code scanner 595 is not normally performed.

In detail, if a sticker on which the encryption code is printed is torn, or the packaging box is damaged during the delivery of the product, the code scanner 595 may not normally recognize the encryption code. In this situation, the delivery person may directly input the authentication information through the input portion 520 provided on the entrance refrigerator 100, specifically, the input button 591 or the touch input portion 594. The authentication information may be a combination of a plurality of numbers or a combination of a plurality of numbers and letters.

When the order is completed, the server of the on-line mall that sells the corresponding product may automatically generate an encryption code (e.g., barcode or QR code) including information about the corresponding product.

When the encryption code and the authentication information are generated, a process (S240) of transmitting the generated encryption code and authentication information and a process (S250) of receiving and storing the transmitted encryption code and authentication information are performed.

In detail, if the on-line mall or on-line mart is a company that directly produces, packages, and sells the product, all the generation and storage process of the encryption code and authentication information may be performed on the server of the on-line mall or on-line mart. In this case, the encryption code and authentication information may be transmitted from the on-line mall or on-line mart to a server of a delivery subject (e.g., the parcel company or the post office). Then, the delivery subject receiving the authentication information may transmit the authentication information to the terminal 30 of the delivery person who delivers the product.

However, in the case in which the on-line mall or on-line mart is an intermediate linker that connects the products of the producers who produce the purchased products to the consumers, that is, a sales agency, the encryption code and authentication information automatically generated by the server of the sales agency may be transmitted to the packaging subject, i.e., the producer or the packaging company.

Here, the generated encryption code may be printed on a surface of the packaging box by the packaging subject or may be attached to the surface of the packaging box in the form of a sticker. The authentication information may be transmitted by the packaging subject to the server of the delivery subject.

In addition, the authentication information automatically generated by the server of the sales agency may be transmitted directly to the delivery subject promised in advance to deliver the product in addition to a method for collectively transmitting the authentication information to the server of the packaging subject together with the encryption code.

As another example, the encryption code and authentication information may be directly generated by the user, that is, the consumer who has ordered a product. In detail, in the server of the on-line mall or on-line mart, when the user completes the payment for the purchased product, a screen for generating the encryption code and authentication information is displayed on the user's computer or terminal screen, so that the user directly generate uses the encryption code and authentication information.

In more detail, when the user directly completes an operation of generating the encryption code and authentication information, the generated encryption code and authentication information are transmitted to and stored in the controller 500 of the entrance refrigerator 100, the user's computer 10, or user's mobile device 20.

In addition, when the delivery person who delivers the purchased product is finally determined, and the delivery person's information, that is, the name of the delivery person and the number of the terminal 30 are transmitted to the user's mobile device 20, the user may directly transmit the generated encryption code and authentication information to the terminal 30 of the delivery person.

Here, the encryption code may be more convenient to be printed on the packaging box of the product or attached in the form of the sticker. Therefore, when the subject that packages the product and the subject that delivers the product are different, the encryption code may be transmitted to the packaging subject that directly packages the product, that is, the seller or producer, and only the authentication information may be transmitted to the delivery subject, that is, the delivery person's mobile terminal 30.

As another method, when the order for the product is completed, the encryption code may be automatically generated by the server of the corresponding on-line mall or on-line mart and transmitted to the entrance refrigerator 100 and the packaging subject, and then, the user may directly generate only the authentication information. The generated authentication information may be transmitted and stored to the controller of the entrance refrigerator 100 and the user's portable terminal. In this state, when the information of the delivery person is transmitted to the user's terminal, the user may transmit the authentication information to the terminal of the delivery person.

In summary, in the present invention, when the user orders the product and completes the payment, the encryption code and/or authentication information may be automatically generated or directly generated by the user, and the generated encryption code and/or authentication information may be transmitted to the controller of the entrance refrigerator 100, the packaging box of the ordered product, and the terminal 30 of the delivery person through the set method and path.

The present invention discloses that the method of transmitting the encryption code and/or authentication information to the entrance refrigerator 100, the packaging box of the ordered product, and the terminal 30 of the delivery person, but is not limited to any one.

Figure 15:
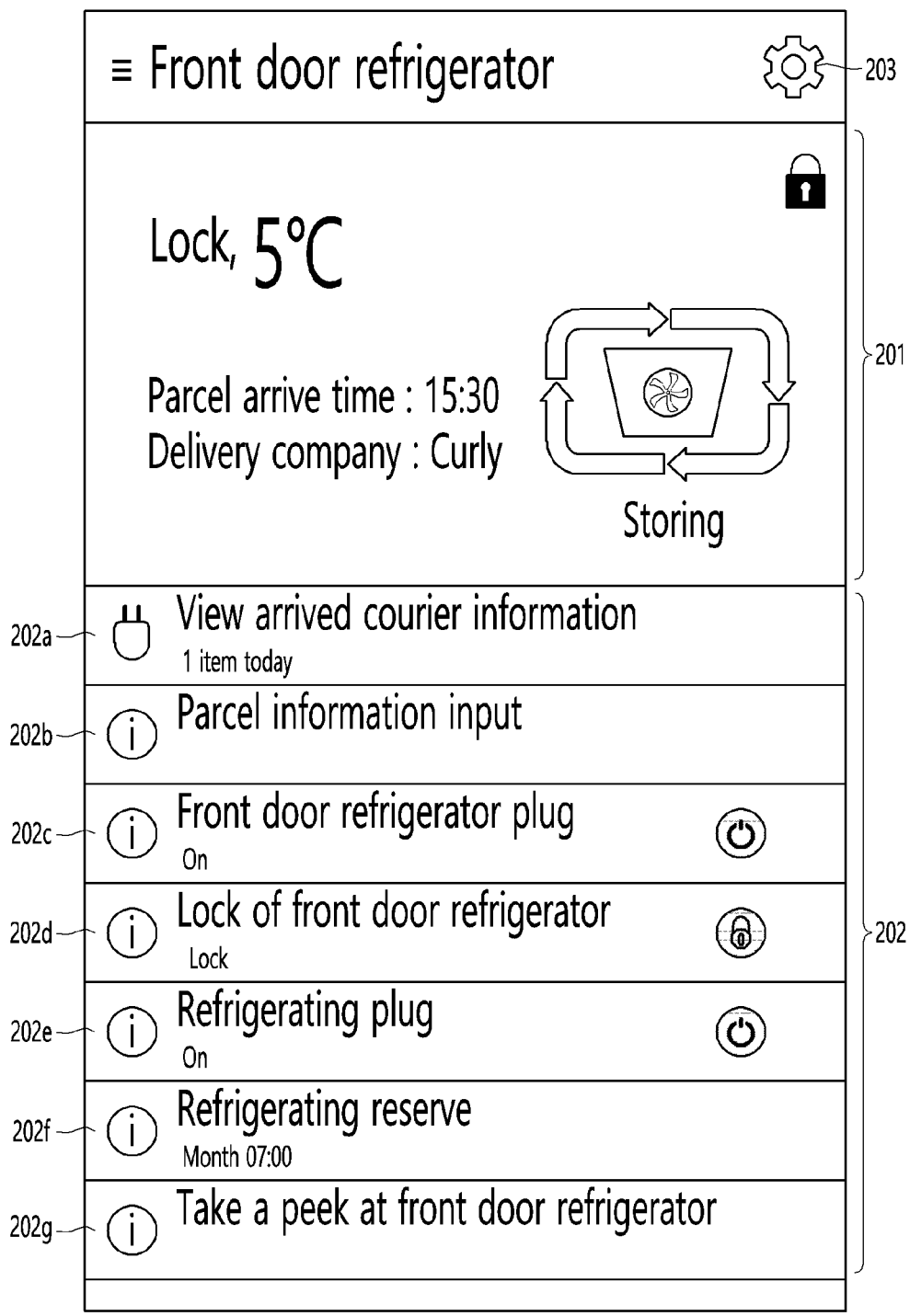
FIG. 15 is a view illustrating a main screen of a control application of the front door refrigerator according to an embodiment of the present invention.

FIG. 15 is a view illustrating the main screen of the control application of the front door refrigerator according to an embodiment of the present invention.

Referring to FIG. 15, the main screen of the control application according to the present invention is divided into a state information display area 201 showing an internal storage state of the front door refrigerator, and a control menu display area 202 showing a menu for controlling the front door refrigerator.

A setting icon 203 for setting an operation condition of the application may be displayed at one side, for example, an upper right corner area of the main screen except for the state information display area 201 and the control menu display area 202.

A current door lock state of the front door refrigerator 100, a room temperature, whether the cooling device is driven, an existence of the stored article, an arrival time of the ordered article, information about the delivery company, etc. will be displayed on the state information display area 201.

Execution menus including an information confirmation menu 202a (incoming information confirmation menu) with respect to the arrival parcel delivery service, a parcel information input menu 202b (incoming information input menu), a plugging menu 202c of the front door refrigerator (power on/off menu of the refrigerator), an opening/closing menu 202d, a cooling module plugging menu 202e, a refrigerating function reservation menu 2020f, and a menu 202g for checking an internal state of the refrigerator may be displayed on the control menu display area 202 in the form of a list-up.

FIG. 16 is a view illustrating a screen displayed when a parcel information confirmation menu is selected.

Referring to FIGS. 15 and 16, if a parcel information check menu (incoming information check menu) is touched to be selected, a delivery date and time and information about the delivery company are listed in chronological order.

In detail, when the user accesses the shopping mall or mart through the Internet to order an article, the delivery driver delivers the ordered product to store the product in the front door refrigerator 100. When the delivery article is stored in the storage compartment 110a of the front door refrigerator 100, and the outer door 180 of the front door refrigerator 100 is closed, the arrival time of the parcel and the information of the delivery company by which the corresponding parcel is delivered are displayed in a memory of the front door refrigerator 100. The parcel arrival time and delivery company information may be understood as parcel information or incoming information. The parcel information or the incoming information may further include information on the delivered article.

The parcel arrival time may be any one of an authentication time of an encryption code, an opening time of the outer door 180, or a closing time of the outer door 180.

The parcel information or incoming information stored in the memory of the front door refrigerator 100 may be transmitted to and stored in the application server 400 that manages the control application.

Then, when the user logs in the control application of the front door refrigerator to select the incoming information check menu, the user may check the incoming information stored in the application server.

The incoming information screen may be displayed in the form of a pop-up window or may be displayed in the form of switching from the main screen to the incoming information screen.

Figure 18:
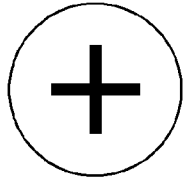
Figure 19:

FIGS. 17 to 19 are views illustrating a screen displayed when a parcel information input menu is selected.

Referring to FIGS. 15 and 17 to 19, if the parcel information input menu (coming information input menu) is touched to be selected, the user may directly input an expected delivery date, delivery company information, and delivery driver contact information.

When the delivery company transmits the parcel information of the ordered article to the user's mobile device 20, the user may check the parcel information to directly input the parcel information by executing the control application.

When the input of the parcel information is completed, and a save button displayed at a lower end of the screen is touched, the parcel information is listed up as illustrated in FIG. 18.

In the case of the shopping site that does not separately generate and transmit the encryption code for the authentication of a delivery person, a user may directly generate the encryption code or the password for the authentication in the parcel information input process to transmit the information to the delivery person's terminal.

In detail, a menu button for generating the authentication code may be provided at the lower end of a parcel information input screen. When the user inputs the delivery person's contact information and then touches the authentication code generation button, a one-time QR code may be generated, or a screen guiding the user to input the password may be displayed.

In this state, when the user touches a send button provided at the lower end of the screen, the QR code or password is transmitted to the delivery person's terminal, and the delivery person reads the received QR code in the encryption code reader of the front door refrigerator 100 or directly input the password to open the outer door 180.

The password generation may be used when the QR code received by the delivery person from the shopping mall server is deleted or lost, or the password code reader does not recognize the QR code. In this case, the delivery person calls the user and requests a password for opening the outer door 180 of the front door refrigerator 100, and the user generates and transmits the password.

Figure 20:
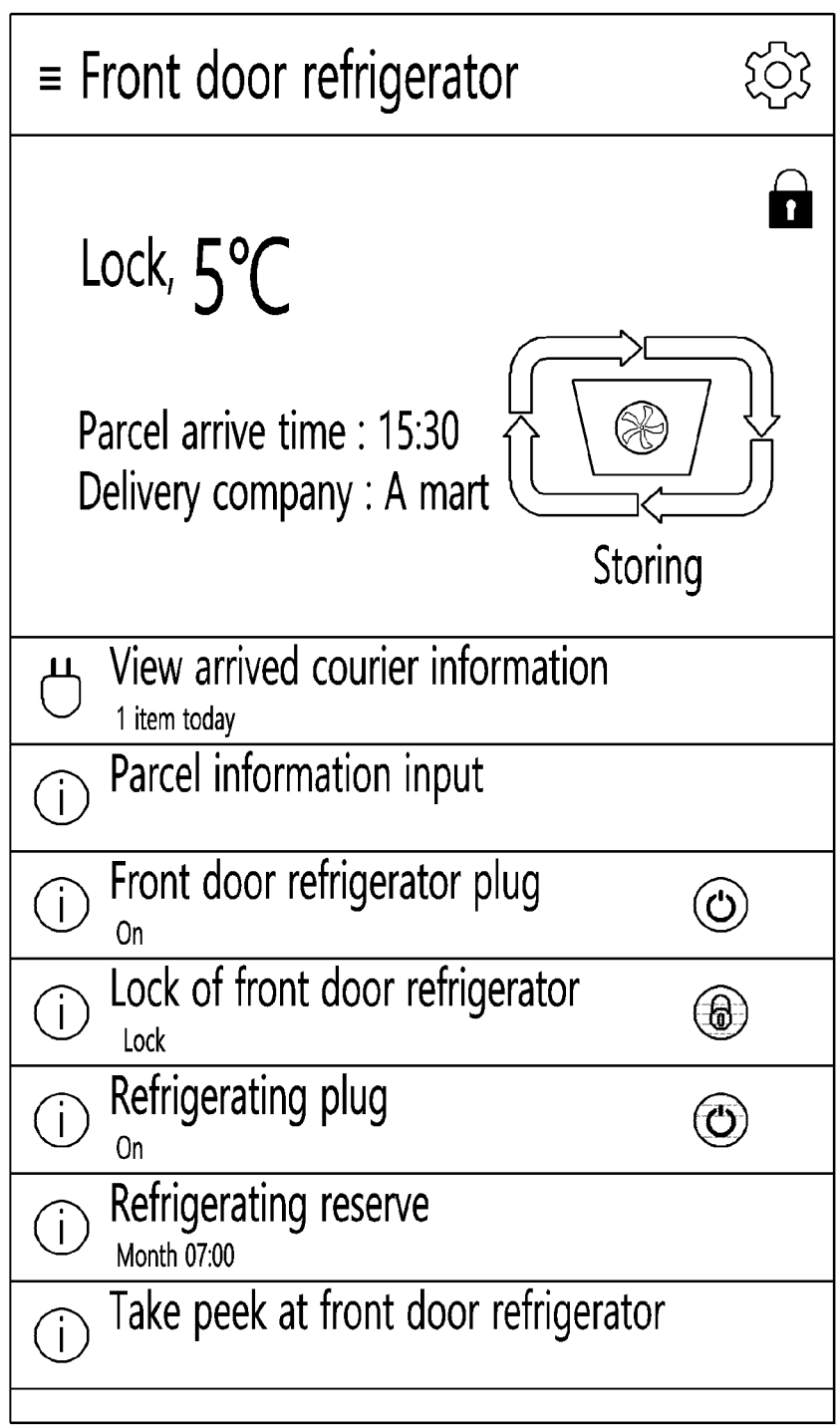
FIGS. 20 to 22 are views illustrating a screen displayed when a plugging menu of the front door refrigerator is selected.
Figure 21:
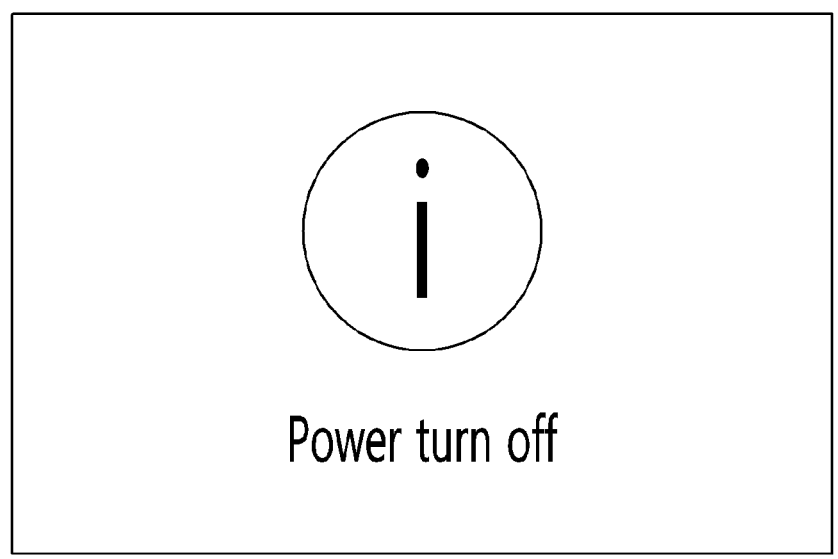
Figure 22:
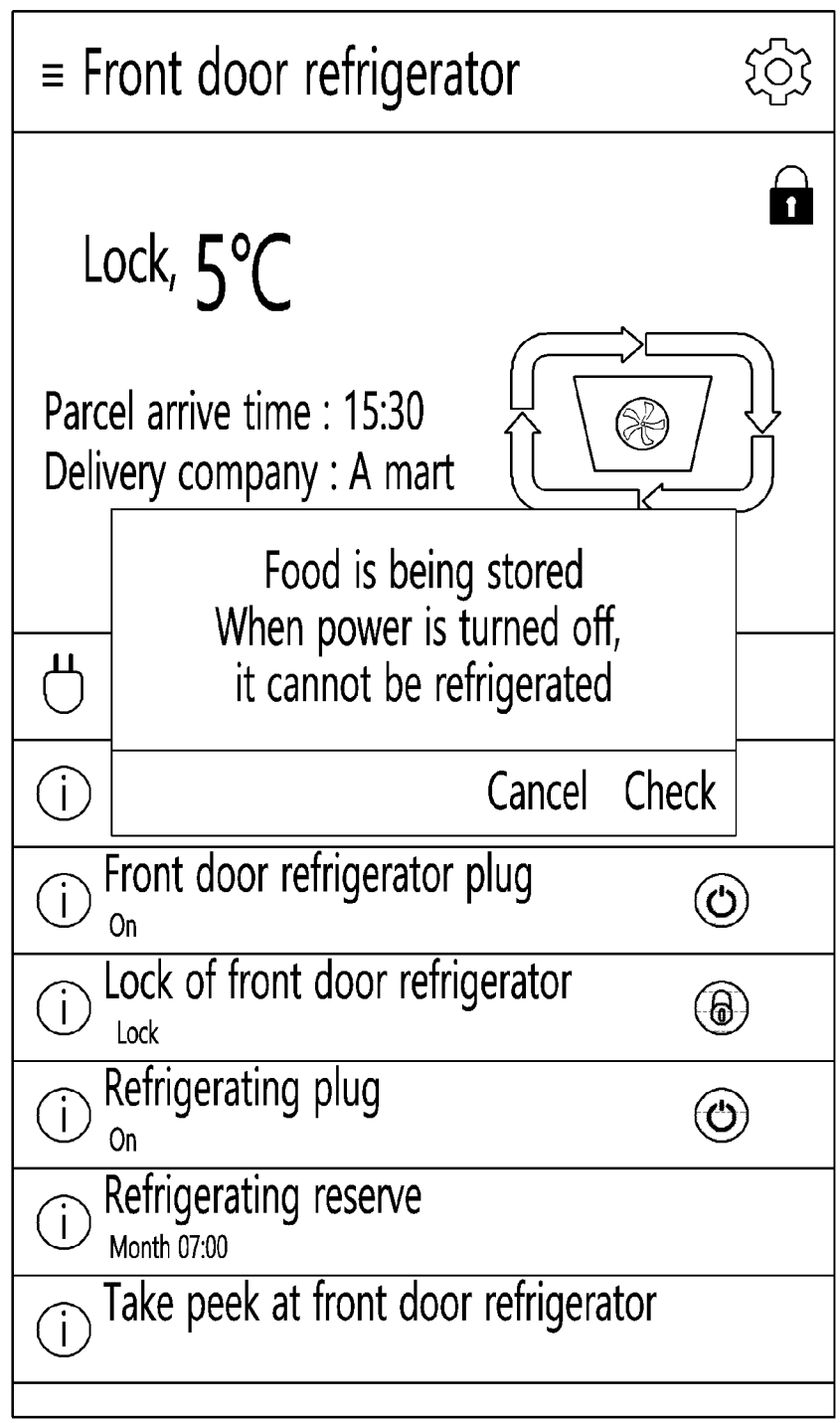

FIGS. 20 to 22 are views illustrating a screen displayed when the plugging menu of the front door refrigerator is selected.

Referring to FIGS. 20 to 22, an icon indicating power may be displayed at a right edge of the plugging menu for the front door refrigerator displayed on the control menu display area.

When the user touches the plugging menu of the front door refrigerator, a shape or color of the icon may be changed, and a text indicating an on/off state of the front door refrigerator may be displayed.

For example, if the user touches the plugging menu of the front door refrigerator while the front door refrigerator 100 is currently turned on, the text information is changed from "on (turn on)" to "off" (turn off), and the power icon is also changed from the state of FIG. 15 to the state of FIG. 20.

In addition, as illustrated in FIG. 21, while being changed from the on state to the off state, a pop-up message indicating that the power of the front door refrigerator is turned off is output to the display portion of the front door refrigerator 100 and/or the screen of the mobile device 20.

In addition, when the power of the front door refrigerator is turned off in the state in which the article is stored in the storage compartment 110*a*, as illustrated in FIG. 22, a notification message or warning message, which notifies a fact that food is currently being stored and a situation that may occur when the power is turned off, may be output on the screen of the mobile device.

Figure 23:
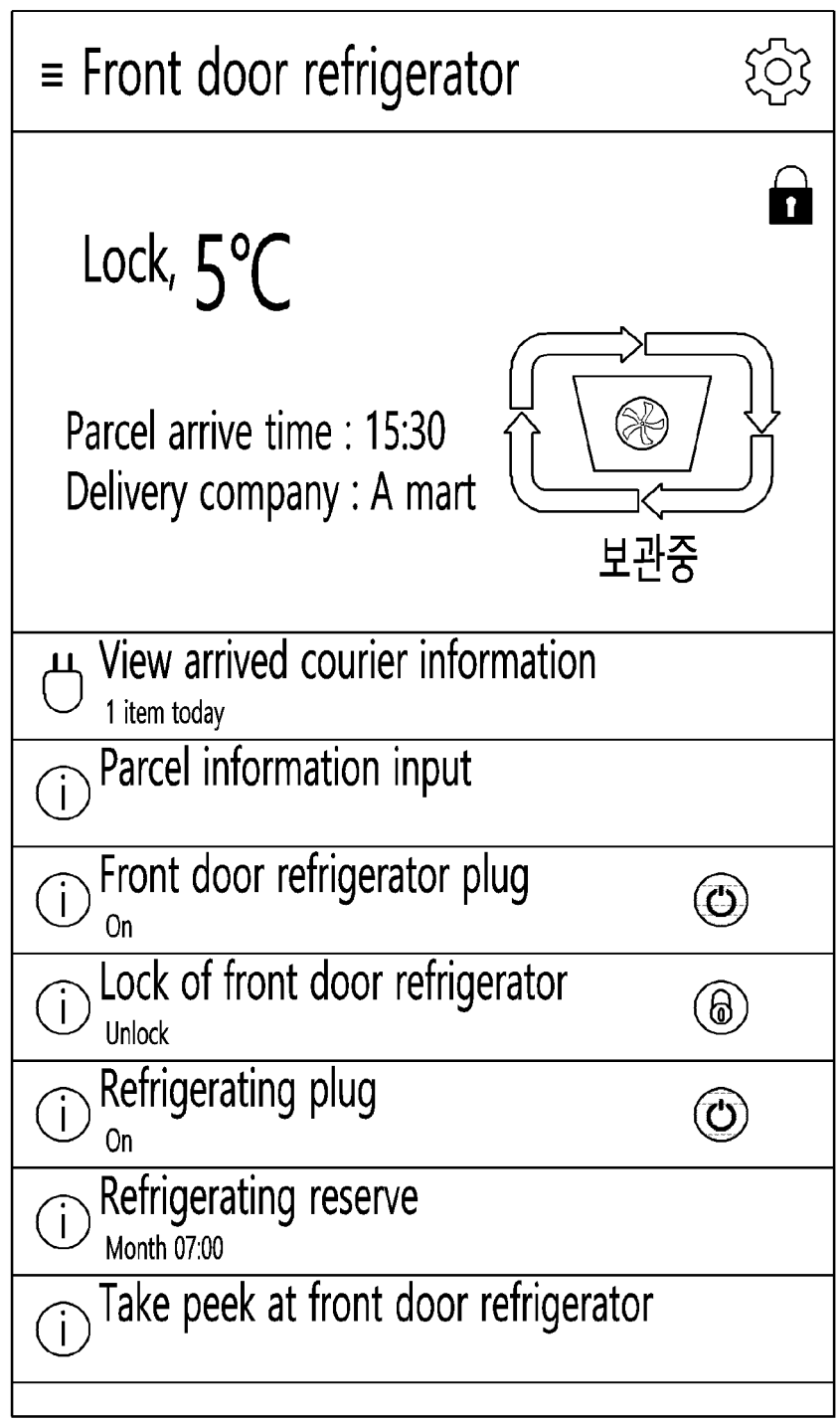
FIG. 23 is a view illustrating a screen displayed when an opening/closing menu of the front door refrigerator is selected.

FIG. 23 is a view illustrating a screen displayed when an opening/closing menu of the front door refrigerator is selected.

Referring to FIG. 23, text and/or icon information indicating the current lock state of the front door refrigerator is displayed on an opening/closing menu of the front door refrigerator.

When the user touches the opening/closing menu of the front door refrigerator, the state or form of the text information and/or icon information is changed at the same time as the lock state is changed.

For example, when the user touches the lock menu for the front door refrigerator while the outer door 180 of the front door refrigerator 100 is locked, the lock state of the outer door 180 is released, and the text information is changed from "locked" to "unlocked".

Also, the icon in the shape of a lock is changed from a locked shape to an opened shape.

Thereafter, when the outer door 180 is closed, the text information displayed on the lock menu of the front door refrigerator is changed from "unlocked" to "locked" again, and the lock-shaped icon is also changed from an unlocked shape to a locked shape.

In the door opening/closing menu described above, when the user directly opens the outer door 180 at the request of a delivery person who does not have the encryption code or password information for opening the outer door 180 of the front door refrigerator 100, this may be usefully used.

For example, when the user purchases an article at a mart near his home and makes a delivery request, the user leaves his or her mobile phone number. Then, the delivery person may arrive at the front of the house and make a request to open the refrigerator 100 for the front door with the user's mobile device 20. In this case, the user may release the locked state of the outer door 180 of the front door refrigerator 100 by selecting the opening/closing menu of the front door refrigerator.

Figure 24:
FIG. 24 is a view illustrating a display portion of the front door refrigerator when the opening/closing menu is selected to be changed in lock state.

FIG. 24 is a view illustrating the display portion of the front door refrigerator when the opening/closing menu is selected to be changed in lock state.

Referring to FIG. 24, when the user touches the opening/closing menu of the front door refrigerator, and the outer door 180 of the front door refrigerator 100 is switched from the locked state to the unlocked state, a lock image that is in the unlocked state may be output on the display portion 581 of the front door refrigerator 100.

In addition, the notification message such as "Lock is set when the door is closed" may be output below the lock image.

Figure 25:
FIG. 25 is a screen displayed when there is no article in the storage compartment.
Figure 26:
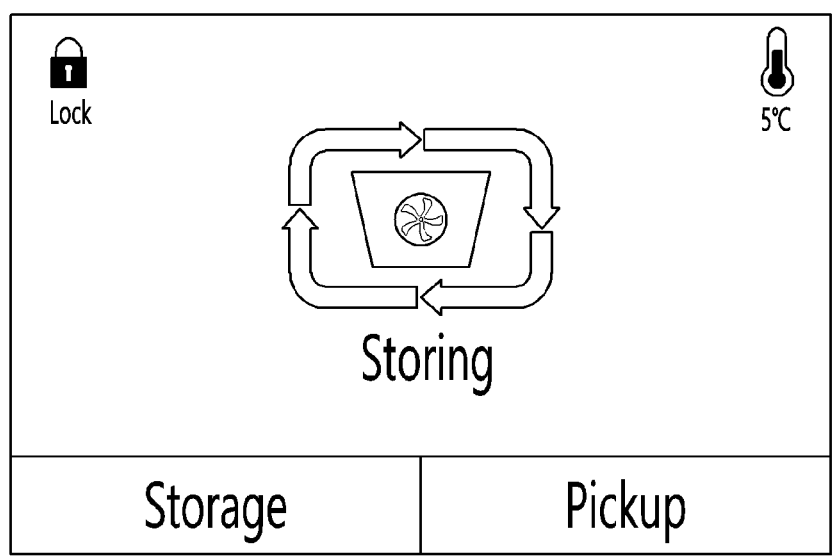
FIG. 26 is a screen displayed when the storage compartment is maintained in a refrigerated state, and there is an article in the storage compartment.

When the user or the delivery person closes the outer door 180, the screen illustrated in FIG. 25 or 26 is displayed.

The screen illustrated in FIG. 25 is a screen displayed when there is no article in the storage compartment 110*a*, and the screen illustrated in FIG. 26 is displayed when the storage compartment 110*a* is maintained in a refrigerated state, and there is an article in the storage compartment.

When the article is being stored in the storage compartment, but a refrigeration operation is not performed, a figure or video indicating the refrigerating storage may not be displayed.

Figure 27:
FIG. 27 is a view illustrating a state of a main screen of a control application according to the present invention, which is shown when a cooling module plugging menu is selected.
Figure 28:
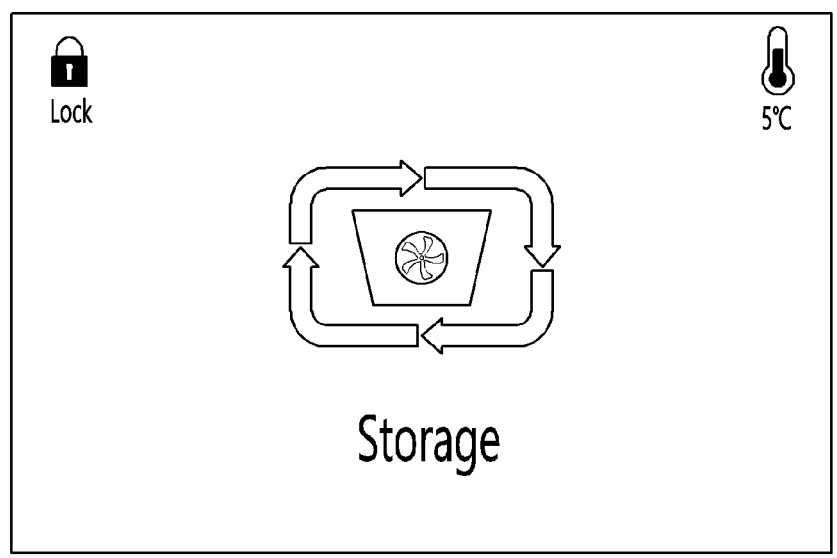
FIG. 28 is a view illustrating a display portion of the front door refrigerator when the cooling module plugging menu is selected.

FIG. 27 is a view illustrating a state of the main screen of the control application according to the present invention, which is shown when a cooling module plugging menu is selected, and FIG. 28 is a view illustrating the display portion of the front door refrigerator when the cooling module plugging menu is selected.

Referring to FIG. 27, among the menus listed in the menu display area 202, characters and/or icons indicating the operating state of the cooling module currently provided in the front door refrigerator 100 are displayed on a cooling module plugging menu. That is, an icon indicating a problem such as "on" or "off" or a power source may be displayed, which may be the same as characters and/or icons displayed on the plugging menu of the front door refrigerator.

The cooling module may be understood to mean the cold air supply device 200.

When the user touches the cooling module plugging menu while the cooling module is turned on to be driven, the text "on" is changed to "off", and an activation state of the icon indicating power may be changed.

When the cooling module is turned off, a basic screen is displayed on the display unit of the front door refrigerator 100.

When the cooling module is turned on by touching the cooling module plugging menu again, as illustrated in FIG. 28, an image or a moving picture indicating the operating state of the cooling module may be displayed on the display portion.

Figure 29:
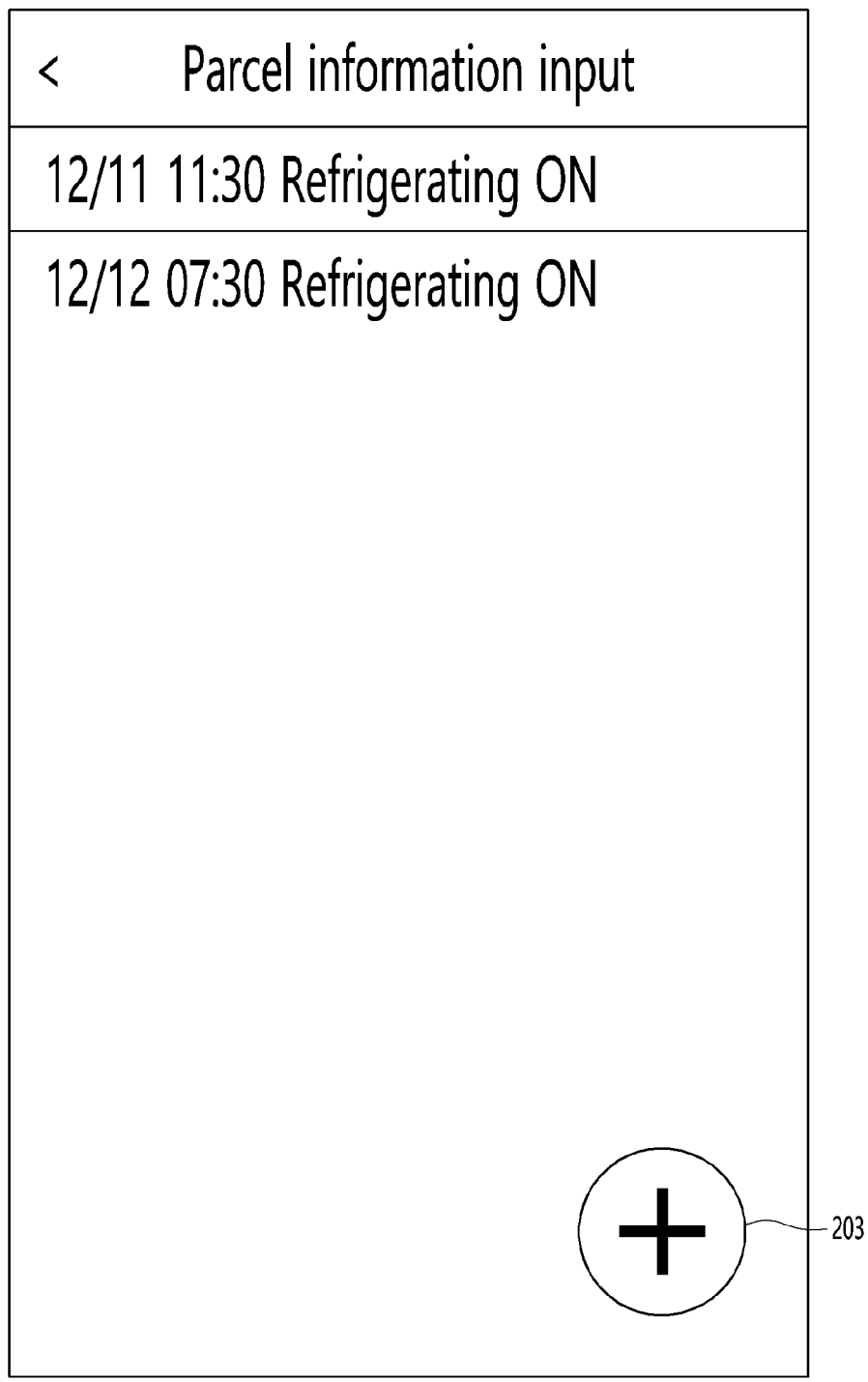

FIGS. 29 to 30 are views illustrating a screen displayed when a menu of the front door when a refrigerating reservation menu is selected.

Referring to FIG. 29, when the user touches the refrigeration reservation menu, the currently set refrigeration reservation list is displayed.

An icon 203 that is touched to add a reservation list is displayed at one side of the screen, and when the icon 203 is touched, an input screen as illustrated in FIG. 30 is displayed.

In this state, if the date and time at which the refrigeration function is turned on is input, and an on button icon 204 displayed at the lower end of the screen is touched, the cooling module is driven at the set date and time.

If an off button icon 205 is touched, the cooling module may be turned off at the set date and time.

Alternatively, when the input of the refrigeration function start date and time is completed, the button icon for moving to the next process is displayed, and when the button icon is touched, it is also possible to perform the process of inputting the refrigeration function stop date and time.

If the menu for checking the internal status of the refrigerator, the camera mounted in the storage chamber 110a may capture the inside of the storage compartment 110a, and the captured image may be transmitted to the user's mobile device 20 through the wireless communication network. Then, the image transmitted to the screen of the mobile device 20 is output, and thus, the user may check what articles are currently stored in the storage compartment.

The invention claimed is:

1. A method for controlling and managing a front door refrigerator by a controller, the method comprising:
    allowing a user to log in an application for controlling the front door refrigerator, which is installed in a mobile device;
    displaying a main screen comprising a menu display area on a display portion of the mobile device, a plurality of input menus displayed on the menu display area comprising at least an incoming information confirmation menu and a plugging menu of the front door refrigerator,
    wherein the incoming information confirmation menu displays incoming information of an article that is received into the front door refrigerator on the display portion of the mobile device, and
    the plugging menu of the front door refrigerator switches power on/off state of the front door refrigerator; and
    receiving a selection of the plugging menu of the front door refrigerator in a state where the front door refrigerator is powered on, and
    when an article does not exist in the storage compartment of the front door refrigerator, displaying a message for notifying that the front door refrigerator will be powered off, and when the article exists in the storage compartment of the front door refrigerator, displaying a message for notifying that the front door refrigerator will be powered off, together with a message for notifying presence of the article in the storage compartment.

2. The method according to claim 1, wherein the incoming information comprises an incoming time and delivery company information of the article.

3. The method according to claim 2, wherein the incoming time of the article is set by any one of:
    a time at which an encryption code corresponding to the article is recognized by an article information recognizer disposed at the front door refrigerator;
    a time at which an outdoor-side door of the front door refrigerator is opened; and
    a time at which the outdoor-side door of the front door refrigerator is closed after being opened.

4. The method according to claim 1, wherein the plurality of input menus comprises an incoming information input menu, and
    when a selection of the incoming information input menu is received, displaying an input screen on the display portion of the mobile device so that a user can input information regarding an article incoming into a storage compartment of the front door refrigerator.

5. The method according to claim 4, wherein the information that can be inputted through the input screen comprises at least one of an incoming date and time, delivery company information, or a delivery person's contact.

6. The method according to claim 4, wherein the input screen comprises a touch button for generating a code, and when a selection of the touch button is received, generating an authentication code comprising at least one of a one-time encryption code or a password, and
    when the authentication code is generated, displaying a touch button for transmitting the generated code to the delivery person's contact on the input screen.

7. The method according to claim 1, wherein when the selection of the plugging menu of the front door refrigerator is received in the state where the front door refrigerator is powered on, and when an article does not exist in the storage compartment of the front door refrigerator, displaying a message for notifying that the front door refrigerator will be powered off on a display portion of the front door refrigerator and/or the display portion of the mobile device.

8. The method according to claim 1, wherein the plurality of input menus comprises an opening/closing menu of the front door refrigerator, and
    when a selection of the opening/closing menu of the front door refrigerator is received, switching a lock/unlock state of the outdoor-side door of the front door refrigerator.

9. The method according to claim 8, wherein, when the switching to unlock state at the opening/closing menu of the front door refrigerator is received, and the lock state of the outdoor-side door is unlocked, displaying a message for notifying that the lock state will be set when the outdoor-side door is closed on a display portion of the front door refrigerator.

10. The method according to claim 1, wherein the plurality of input menus comprises a plugging menu of a cooling module, and
when a selection of the plugging menu of the cooling module is received, switching power on/off state of the cooling module.

11. The method according to claim 1, wherein the plurality of input menus comprises a refrigeration function reservation menu, and
when a selection of the refrigeration function reservation menu is received, displaying currently set refrigeration function reservation information and a touch button for adding a reservation on the display portion of the mobile device.

12. The method according to claim 11, wherein, when a selection of the touch button for adding the reservation is received, displaying a screen for inputting a date and time at which the refrigeration function is turned on or off.

13. The method according to claim 1, wherein the plurality of input menus comprises a menu for checking a situation inside the front door refrigerator, and
when a selection of the menu for checking a situation is received, displaying an image inside a storage compartment, which is captured by a camera installed in the storage compartment of the front door refrigerator, and transmitted to the user's mobile device, on the display portion of the mobile device.

* * * * *